(12) United States Patent
Dange

(10) Patent No.: US 10,878,631 B2
(45) Date of Patent: *Dec. 29, 2020

(54) PROVIDING AN AUGMENTED REALITY OVERLAY FOR DISPLAY OVER A VIEW OF A USER

(71) Applicant: Facebook, Inc., Menlo Park, CA (US)

(72) Inventor: Amod Ashok Dange, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,724

(22) Filed: Mar. 14, 2019

(65) Prior Publication Data

US 2019/0213795 A1 Jul. 11, 2019

Related U.S. Application Data

(63) Continuation of application No. 15/661,650, filed on Jul. 27, 2017, now Pat. No. 10,242,502.

(51) Int. Cl.
| | |
|---|---|
| *G06T 19/00* | (2011.01) |
| *G06K 9/00* | (2006.01) |
| *G06Q 50/00* | (2012.01) |
| *H04L 29/08* | (2006.01) |

(Continued)

(52) U.S. Cl.
CPC ........ *G06T 19/006* (2013.01); *G06K 9/00228* (2013.01); *G06K 9/00604* (2013.01); *G06K 9/00671* (2013.01); *G06Q 50/01* (2013.01); *H04L 65/00* (2013.01); *H04L 67/18* (2013.01); *G06K 9/00087* (2013.01); *G06K 9/6201* (2013.01); *H04L 67/02* (2013.01); *H04L 67/12* (2013.01); *H04L 67/306* (2013.01)

(58) Field of Classification Search
CPC combination set(s) only.
See application file for complete search history.

(56) References Cited

U.S. PATENT DOCUMENTS

| | | | |
|---|---|---|---|
| 5,850,222 A | * | 12/1998 | Cone ....................... G06T 17/20 345/418 |
| 8,055,675 B2 | | 11/2011 | Higgins et al. |

(Continued)

OTHER PUBLICATIONS

U.S. Appl. No. 15/661,650, May 9, 2018, Office Action.
U.S. Appl. No. 15/661,650, Nov. 9, 2018, Notice of Allowance.

*Primary Examiner* — Motilewa Good Johnson
(74) *Attorney, Agent, or Firm* — Keller Jolley Preece

(57) ABSTRACT

The present disclosure is directed toward systems and methods for generating and providing an augmented reality overlay for display in connection with an augmented reality display device. For example, systems and methods described herein identify a user being viewed through an augmented reality display device, and builds an augmented reality overlay for the user that is displayed on a view of the user through the augmented reality display device. Systems and methods described herein build the augmented reality overlay based on the location of the augmented reality display device, and on other networking system information including a networking system relationship between the user wearing the augmented reality display device and the user who is being looked at through the augmented reality display device.

20 Claims, 13 Drawing Sheets

(51) Int. Cl.
   *H04L 29/06*    (2006.01)
   *G06K 9/62*     (2006.01)

(56) References Cited

U.S. PATENT DOCUMENTS

| | | |
|---|---|---|
| 8,743,145 B1 * | 6/2014 | Price ............... G06T 19/006 |
| | | 345/633 |
| 9,588,730 B2 | 3/2017 | Mitchell |
| 9,779,550 B2 | 10/2017 | Tobita |
| 9,818,224 B1 | 11/2017 | Worley et al. |
| 9,836,883 B2 | 12/2017 | Tran et al. |
| 10,242,502 B2 | 3/2019 | Dange |
| 10,366,533 B2 * | 7/2019 | Sugita ............... G06T 19/00 |
| 2013/0011009 A1 | 1/2013 | Chen et al. |
| 2013/0290106 A1 | 10/2013 | Bradley et al. |
| 2014/0267010 A1 | 9/2014 | Pasquero et al. |
| 2014/0267406 A1 | 9/2014 | Mullins |
| 2015/0154799 A1 | 6/2015 | Rios et al. |
| 2015/0235267 A1 * | 8/2015 | Steube ............... H04N 21/4223 |
| | | 705/14.58 |
| 2015/0279117 A1 | 10/2015 | Schimke |
| 2017/0053442 A1 | 2/2017 | Sumner et al. |
| 2018/0197342 A1 * | 7/2018 | Kasahara ........... G06T 19/00 |
| 2018/0260843 A1 * | 9/2018 | Hiranandani ...... G06K 9/6274 |
| 2018/0285890 A1 * | 10/2018 | Hansen ............... G06F 3/0481 |

\* cited by examiner

PROVIDING AN AUGMENTED REALITY OVERLAY FOR DISPLAY OVER A VIEW OF A USER

CROSS REFERENCE TO RELATED APPLICATIONS

This application is a continuation of U.S. patent application Ser. No. 15/661,650, filed Jul. 27, 2017. The aforementioned application is hereby incorporated by reference in its entirety.

BACKGROUND

Augmented reality provides users with views of physical, real-world environments that have been augmented by sound, video, and/or graphics. Augmented reality systems and applications provide a number of advantages in technology areas, such as entertainment and gaming. To illustrate, augmented reality games, such as those playable using mobile devices (e.g., smartphones), are becoming increasingly commonplace and popular. However, the boundaries of augmented reality have just begun to be explored. In particular, conventional augmented reality systems have merely scratched the surface with regard to the application of augmented reality in the day-to-day activities of user. Thus, there are a number of disadvantages corresponding to conventional augmented reality systems.

SUMMARY

One or more embodiments described herein provide benefits and/or solve one or more of the foregoing or other problems in the art with augmented reality systems. For example, the present application discloses various embodiments of systems, methods, and computer-readable media that provide an augmented reality framework that alters the way a networking system user looks and speaks. The systems and methods described herein utilize information associated with a user (e.g., as collected by a social networking system) to generate an augmented reality overlay for the user to alter the user's appearance. To illustrate, the augmented reality overlay can include attire, jewelry, makeup, hairstyle choices, etc. that are appropriate for the user's circumstances. The systems and methods described herein then anchor the augmented reality overlay to the user within a display of an augmented reality device, such that the user appears to be wearing the attire, along with the makeup, hairstyle, etc. that are included in the augmented reality overlay.

Additionally, in at least one embodiment, an augmented reality overlay is customized based on the identity of a viewing user. In other words, each viewing user can be provided a unique view of the user based on a variety of factors and other information associated with a relationship between the viewing user and the user being viewed. For example, the disclosed augmented reality system can utilize networking system relationship information to determine that a first attire choice for the user is appropriate to display to the user's employer, while a second attire choice for the user is appropriate to display to the user's friend. Thus, the disclosed augmented reality system takes an additional layer of social factors into account beyond simple location considerations when generating a user's augmented reality overlay.

Furthermore, the disclosed augmented reality system includes an auditory element that enables seamless and instantaneous speech translation within the augmented reality framework. For example, one or more embodiments include translation services that enable a first user and a second user to hold a normal conversation, even though both users speak different languages. In at least one embodiment, systems and methods described herein include a graphical augmented reality element that makes a user's mouth appear to be synchronized to machine-translated speech. Thus, systems and methods described herein provide the appearance that the user is speaking the language of the listening user, regardless of the actual language being spoken by the speaking user.

The following description sets forth additional features and advantages of one or more embodiments of the disclosed systems and methods. In some cases, such features and advantages will be obvious to a skilled artisan from the description or may be learned by the practice of the disclosed embodiments.

BRIEF DESCRIPTION OF THE DRAWINGS

The detailed description refers to the drawings briefly described below.

DETAILED DESCRIPTION

Figure 1:
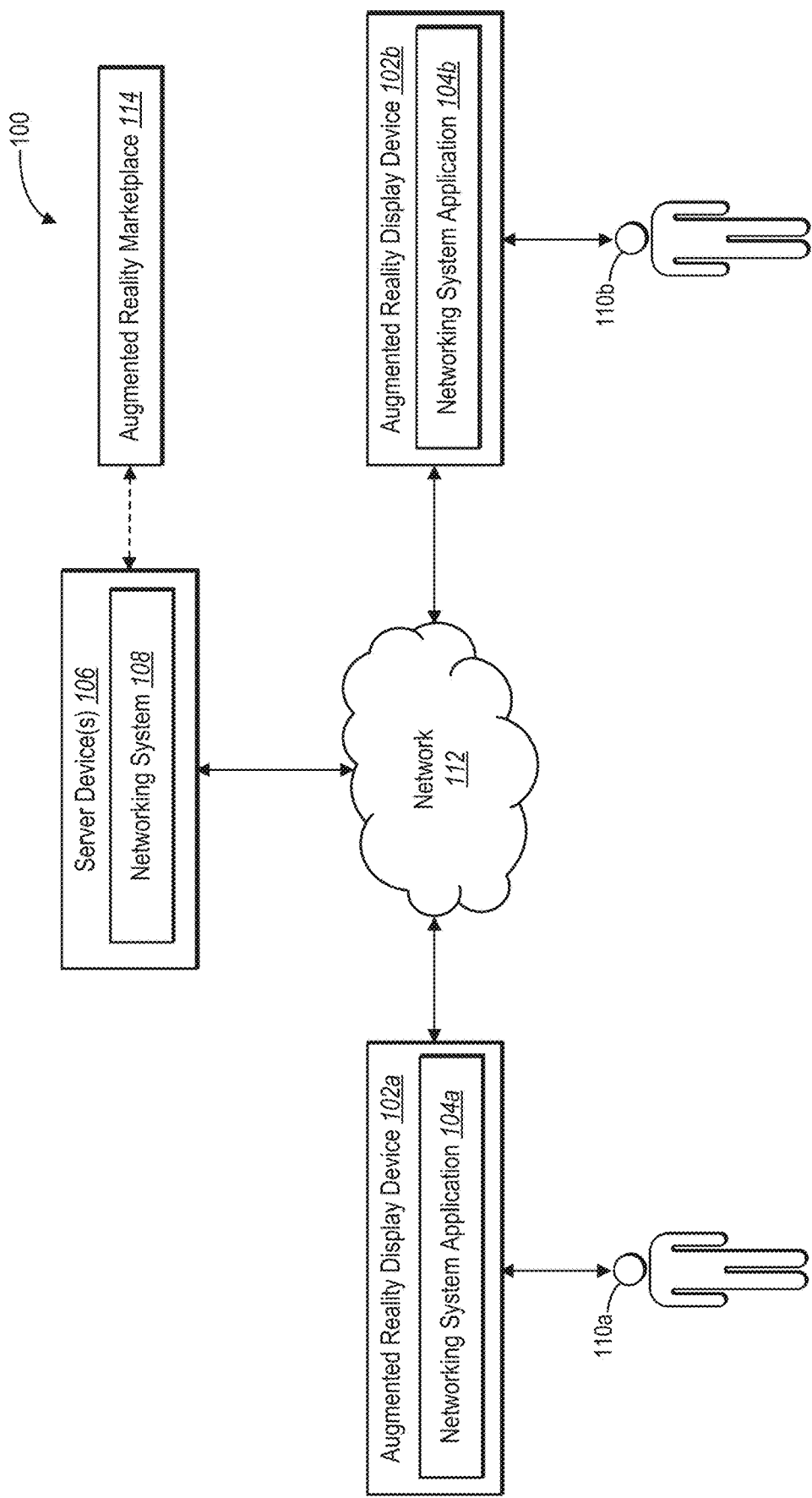
FIG. 1 illustrates an environmental diagram of a augmented reality system in accordance with one or more embodiments.

One or more embodiments described herein provide benefits and/or solve one or more of the foregoing or other problems in the art with systems and methods for building an augmented reality framework that enables a networking system user to appear and sound appropriately regardless of his location and language skills. For example, utilizing the augmented reality system described herein, a networking system user can attend a formal event in a different country and appear to other users to be wearing expensive evening attire appropriate for the country and speaking the language of the country, even though the user is actually wearing informal clothes and cannot speak the country's language. Thus, the augmented reality system enables users to pare down their wardrobes, travel with confidence, and move from one event to the next without needing to change.

As used herein, "augmented reality" refers to a technology that creates a composite view for a user including computer-generated elements in association with the user's real-life view. For example, in one or more embodiments, the augmented reality system generates an augmented reality overlay including one or more augmented reality elements, and anchors that augmented reality overlay over the user's view within an augmented reality display device. As used herein, an "augmented reality overlay" refers to a graphical image that overlays part or all of a user within an augmented reality view of the user. In one or more embodiments, an augmented reality overlay is composed of one or more augmented reality elements.

As used herein, an "augmented reality element" refers to computer-generated elements that comprise part of an augmented reality overlay. An augmented reality element, as used herein, can be one of many types. For example, an augmented reality element can be a display or graphical element (e.g., representing an article of clothing) or can be an effect (e.g., such as changing eye color, removing facial hair, etc.). In one example, an augmented reality overlay includes augmented reality elements such as a tuxedo, an expensive watch, a fresh haircut, and trimmed facial hair. In yet further embodiments, an augmented reality element can include any other computer-generated visual and/or audio content for augmenting a view of a real-world environment.

In one or more embodiments, the augmented reality system described herein requires users to utilize augmented reality devices. For example, an augmented reality device can be a head-mounted display device (e.g., GOOGLE GLASS®, MICROSOFT HOLOLENS®, etc.) such that a user's true appearance is effectively masked behind a displayed augmented reality overlay. In at least one embodiment, the augmented reality display device also includes audio features (e.g., headphones, ear buds, etc.) that provide audio playback to the user wearing the device.

In one illustrative example of the augmented reality system, the augmented reality system initially enables a user to define augmented reality rules or preferences via a networking system. For example, augmented reality system users can configure rules that establish attire guidelines (e.g., "Never put me in clothing that is orange," "Never show me wearing a dress," etc.), and other appearance choices (e.g., "I always want to be shown with facial hair," "Don't change my hairstyle," etc.). In one or more embodiments, the augmented reality system automatically generates a augmented reality overlay for a user, but relies on the user's pre-established rules or preferences as boundaries within which to operate. In other words, the user's pre-established preferences serve to keep the augmented reality system from generating a augmented reality overlay that includes augmented reality elements that the user would dislike.

As mentioned above, in one or more embodiments, the augmented reality system assumes that all users are constantly utilizing an augmented reality display device (e.g., a head-mounted display device or "augmented reality display device"). In at least one embodiment, in order for the augmented reality system to effectively ensure all augmented reality system users look and sound appropriately for a given setting, all users must be utilizing an augmented reality display device. Thus, all augmented reality system users can then view augmented reality overlays and hear translated speech. Accordingly, the embodiments described herein assume that all augmented reality system users are utilizing an augmented reality display device.

In at least one embodiment, the augmented reality system first determines a user's location and setting in order to determine the correct appearance and language options available for generating an augmented reality overlay. For example, when an augmented reality system user walks into a formal dinner event at an upscale restaurant, the augmented reality system detects the user's location and setting in order to determine that formal attire is appropriate. In one or more embodiments, the augmented reality system detects the user's location utilizing a GPS signal and/or a WiFi signal from the user's augmented reality display device. Furthermore, the augmented reality system determines the user's setting by performing image analysis on an image captured by the user's augmented reality display device.

Next, the augmented reality system identifies the co-user at whom the user is looking. As discussed above, the augmented reality system provides an augmented reality overlay for an augmented reality system co-user who is being looked at through an augmented reality display device of an augmented reality system user. Thus, the co-user does not see the augmented reality overlay provided by the augmented reality system to the user, even though the augmented reality overlay is generated in association with a view of the co-user. Accordingly, when the user first looks at the co-user, the augmented reality system identifies the co-user in order to determine whether the co-user is an augmented reality system user. In one or more embodiments, the augmented reality system utilizes a video stream of images captured by a camera associated with the augmented reality display device of the user in order to identify the co-user. For example, the augmented reality system can utilize facial recognition techniques, image matching, eye scanning, and so forth in order to identify the co-user and to determine that the co-user is an augmented reality user.

After identifying the co-user, the augmented reality system identifies the co-user's pre-configured rules or preferences, and begins building an augmented reality overlay for the co-user. In at least one embodiment, the augmented reality system begins building the co-user's augmented reality overlay by performing a 3D scan on an image of the co-user from the video stream captured by the user's augmented reality display device. For example, the 3D scan of the image determines the 3-dimensional shape of the co-user by creating a point cloud of data from the co-user's 2-dimensional surface, as shown in the captured image. In one or more embodiments, the augmented reality system then builds a graphical mesh on the co-user's 3-dimensional shape. In at least one embodiment, the augmented reality system can attach one or more augmented reality elements to the graphical mesh in order to generate a augmented reality overlay for the co-user.

Accordingly, once the augmented reality system has built the graphical mesh representing the co-user's 3-dimensional shape, the augmented reality system can determine appropriate augmented reality elements to attach to the graphical mesh. In one or more embodiments, the augmented reality system determines appropriate augmented reality elements by selecting augmented reality elements that are appropriate to the location and setting of the user and the co-user, and scoring the selected elements based on a variety of other considerations. The augmented reality system then attaches the highest scoring augmented reality elements to the graphical mesh.

For example, if the user and the co-user are located at an upscale restaurant in the evening, the augmented reality system will select a collection of augmented reality elements that are appropriate for that setting (e.g., evening wear, high-end jewelry, modern hairstyles, etc.). Following this, the augmented reality system calculates a score for each element in the collection of augmented reality elements based on a variety of factors.

In at least one embodiment, the augmented reality system calculates a score for an augmented reality element based on the co-user's pre-configured rules or preferences. For example, if the co-user previously configured a set of rules that indicate he never wants to be shown wearing coat-tails or a top hat, the augmented reality system will calculate a low score for augmented reality elements that include suits with coat-tails or hats that are top-hats. Similarly, if the co-user previously configured a set of rules that indicated he prefers to be shown wearing the color black with his hair parted on the right side, the augmented reality system will calculate a high score for augmented reality elements that include black attire or hairstyles with a right-hand part.

After scoring each of the collection of augmented reality elements based on the co-user's pre-configured rules or preferences, the augmented reality system can further weight the scores calculated for each augmented reality element based on networking system information. For example, in one or more embodiments, the augmented reality system functions as part of a networking system, and the user and co-user are networking system users. Accordingly, in at least one embodiment, the augmented reality system can gather data about the location of the user and co-user from the networking system. To illustrate, the networking system may have additional information about the formal event that both users are attending (e.g., a requested dress code, an itinerary for the event, etc.). Additionally, the networking system may have additional relevant information, such as the weather conditions. Thus, the augmented reality system can further calculate the score for each of the collection of augmented reality elements based on this additional networking system data.

Furthermore, the augmented reality system can weight the scores calculated for each augmented reality element based on a relationship coefficient between the user and the co-user. In one or more embodiments, the augmented reality system calculates a relationship coefficient that numerically represents the strength of the relationship between two users. For example, the relationship coefficient is informed by an amount of networking system activity common to both users (e.g., sharing each other's posts, tagging each other in posts, checking in at the same locations, etc.), in addition to their profile information (e.g., indicating they work for the same company, live in the same area, have the same hobbies, are related, have been networking system "friends" for a threshold period of time, etc.). Accordingly, the augmented reality system can score certain augmented reality elements higher when the relationship coefficient between the user and the co-user is high, and vice versa.

For instance, the user and the co-user may attend the formal event described above and share a high relationship coefficient. Their relationship coefficient may be high because they frequently tag each other in posts related to a particular sports team, and have checked-in at that sports team's games together in the past. In light of this, the augmented reality system may score certain augmented reality elements higher. For example, the augmented reality system may score an augmented reality element displaying a neck tie in the color of the sports team higher, even though it is a fairly unusual color.

After the augmented reality system has calculated a score for each of the collection of augmented reality elements, the augmented reality system selects the highest scoring augmented reality elements and starts building the co-user's augmented reality overlay. In at least one embodiment, the augmented reality system builds the co-user's augmented reality overlay by attaching the highest scoring augmented reality elements to the graphical mesh representing the co-user's 3-dimensional shape. For example, in attaching an augmented reality element representing a black tuxedo to the co-user's graphical mesh, the augmented reality system can resize the augmented reality element in order to cover the appropriate areas of the graphical mesh (e.g., lengthen sleeves, shorten trousers, widen a waistband, etc.). In one or more embodiments, the augmented reality system attaches the highest scoring augmented reality elements to the graphical mesh according to a set of reality-based rules (e.g., a person should not wear more than one pair of pants, a person should not wear sunglasses indoors or at night, etc.).

Once the augmented reality system attaches one or more augmented reality elements to the co-user's graphical mesh, the graphical mesh becomes the co-user's augmented reality overlay. At this point, the augmented reality system provides the co-user's augmented reality overlay to the augmented reality display device of the user. In order to correctly display the co-user's augmented reality overlay, the augmented reality system anchors the augmented reality overlay within the user's augmented reality display device. For example, in order to account for the movements of both the user and the co-user (e.g., shifting from one food to the other, head tilts, etc.), the augmented reality system anchors the augmented reality overlay within the user's view via the augmented reality display device. At this point, the co-user appears to the user to be wearing different attire than what he is really wearing, and the co-user's actual attire is successfully masked from the user via the user's augmented reality display device.

In one or more embodiments, the augmented reality system not only ensures that a user is appropriately attired for a particular setting, the augmented reality system also ensures that the user can effectively communicate in the particular setting. For example, as mentioned above, an augmented reality display device can include some type of headphone that enables the user to hear auditory playback. Thus, utilizing networking system information as well as location information, the augmented reality system can determine what language is being spoken to a user and what language(s) the user is capable of understanding. The augmented reality system can then provide translation services when the language being spoken to a user is not a language that the user can understand.

Furthermore, in at least one embodiment, the augmented reality system can provide an augmented reality element within an augmented reality overlay that makes the user's mouth appear to be synchronized with any machine-translation provided by the augmented reality system. To illustrate, if the co-user is speaking French and the user only understands English, the augmented reality system translates the co-user's French into English, provides the English translation to the user via the second user's augmented reality display device headphones, and adds an augmented reality element to the co-user's augmented reality overlay that displays a digital mouth overlaid on the co-user's mouth that appears to be synchronized to the English translation. The augmented reality system can provide these same features with regard to the user such that the co-user can understand what the user says in English.

FIG. 1 illustrates an example block diagram of an environment for implementing the augmented reality system 100. As illustrated in FIG. 1, the augmented reality system 100 includes the augmented reality display devices 102a, 102b, the server device(s) 106, and the augmented reality marketplace 114, which are communicatively coupled through a network 112. As shown in FIG. 1, the augmented reality display devices 102a, 102b include the networking system application 104a, 104b, respectively. Additionally shown in FIG. 1, the server device(s) 106 includes a networking system 108. Further shown in FIG. 1, the augmented reality display devices 102a, 102b are associated with the users 110a, 110b, respectively.

The augmented reality display devices 102a, 102b, the server device(s) 106, and the augmented reality marketplace 114 communicate via the network 112, which may include one or more networks and may use one or more communication platforms or technologies suitable for transmitting data and/or communication signals. In one or more embodiments, the network 112 includes the Internet or World Wide Web. The network 112, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Although FIG. 1 illustrates a particular arrangement of augmented reality display devices 102a, 102b, the server device(s) 106, the augmented reality marketplace 114, and the network 112, various additional arrangements are possible. For example, the augmented reality display devices 102a, 102b may directly communicate with the networking system 108, bypassing the network 112. Further, the augmented reality system 100 can include any number of augmented reality display devices communicating with the networking system 108. Additional details relating to the network 112 are explained below with reference to FIG. 7.

In one or more embodiments, the augmented reality marketplace 114 is an external server wherein augmented reality system users can obtain additional augmented reality elements for inclusion in one or more augmented reality overlays. For example, as will be discussed further below, an augmented reality overlay is composed of one or more augmented reality elements. In at least one embodiment, a user can specify that augmented reality system 100 includes certain augmented reality elements in all augmented reality overlays associated with the user. In additional or alternative embodiments, the augmented reality marketplace 114 is integrated with and hosted by the networking system 108.

To illustrate, other entities (e.g., businesses, celebrities, artists, etc.) can generate augmented reality elements for sale via the augmented reality system 100. For example, a famous artist may generate a limited edition augmented reality element that represents a piece of jewelry. If an augmented reality system user purchases an augmented reality element via the augmented reality marketplace 114, the user may specify that the augmented reality system 100 include the purchased augmented reality element in future augmented reality overlays associated with the user. Additionally or alternatively, the user can define rules that specify when the augmented reality system 100 should include the purchased augmented reality element in an augmented reality overlay (e.g., only on formal occasions, only on certain holidays, etc.).

As mentioned above, the augmented reality display devices 102a, 102b include an augmented reality display, a video capturing device (e.g., a digital camera), and an audio playback mechanism (e.g., headphones). For example, in one or more embodiments, the augmented reality display of the augmented reality display devices 102a, 102b displays a augmented reality overlay displayed in connection with on the wearer's normal view. In at least one embodiment, the augmented reality display operates as a pair of lenses (e.g., eye glass lenses, contact lenses, etc.) positioned over the wearer's eyes. Additionally, in one or more embodiments, the video capturing devices associated with the augmented reality display devices 102a, 102b are micro digital video cameras mounted (e.g., to an ear piece, or over the bridge of the wearer's nose) to the augmented reality display devices 102a, 102b, respectively. Further, the audio playback mechanism of the augmented reality display devices 102a, 102b may include headphones, ear buds, or speakers built into a portion of the augmented reality display devices 102a, 102b (e.g., built into the ear pieces). Thus, in a preferred embodiment, the augmented reality display devices 102a, 102b are similar to eye glasses with all the component parts built-in. In one or more embodiments, the augmented reality display devices 102a, 102b also include a processor capable of executing software code.

In at least one embodiment, the users 110a, 110b of the augmented reality display devices 102a, 102b, respectively, are users of the networking system 108. For example, in at least one embodiment, the users 110a, 110b are networking system users and can engage in networking system activities (e.g., liking and sharing posts, uploading and sharing digital pictures and videos, checking in at various locations, etc.). In one embodiment, the users 110a, 110b are also "friends" (e.g., associated co-users) via the networking system 108. Further, in at least one embodiment described herein, the user 110a is the augmented reality system user looking at the user 110b (e.g., the co-user). Thus, in that embodiment, the augmented reality system 100 provides an augmented reality overlay to the augmented reality display device 102a that is anchored over the user's 110a view of the user 110b.

Figure 2A:
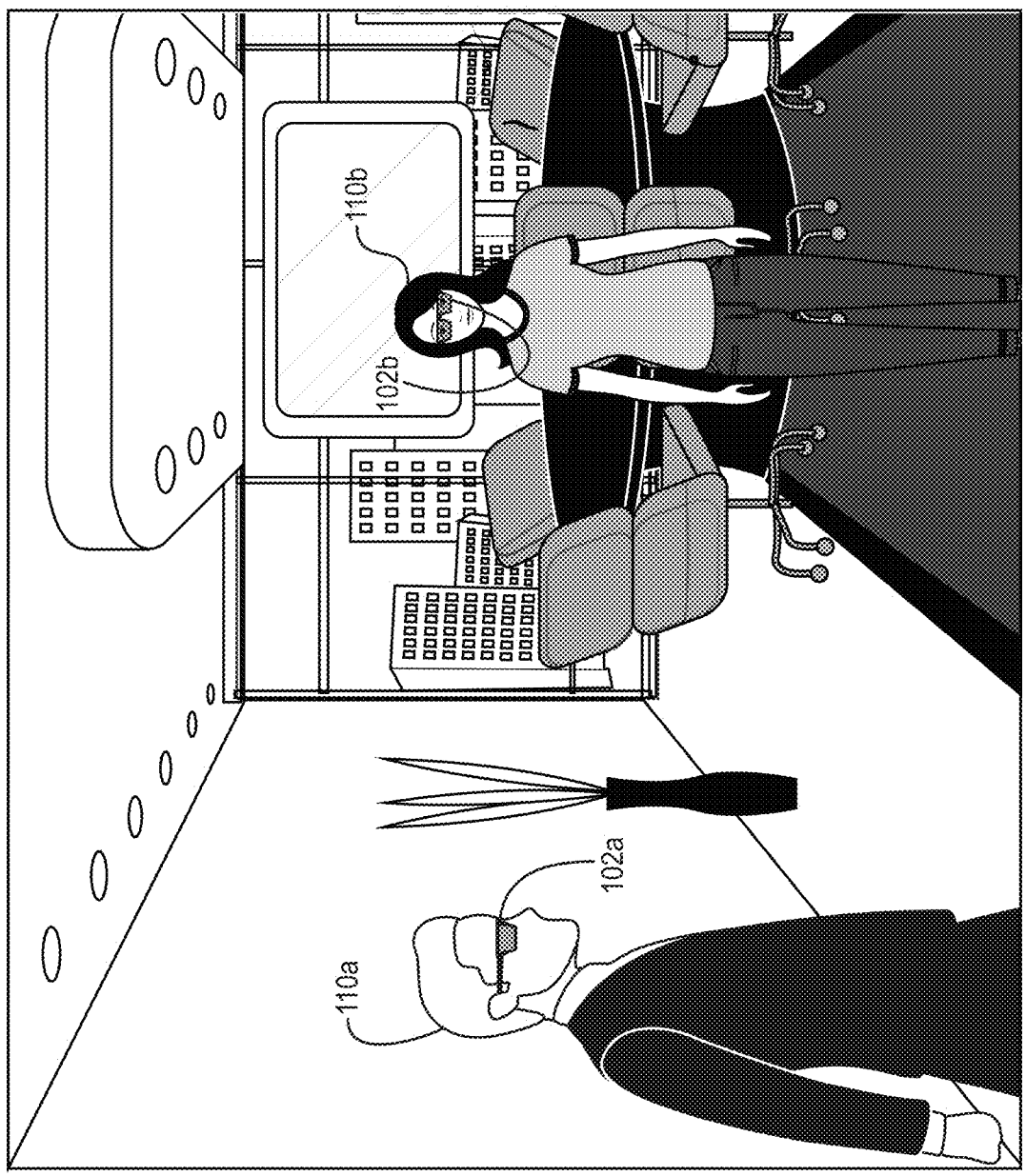
FIGS. 2A-2D illustrate a series of views illustrating various features in accordance with one or more embodiments.

For example, as illustrated in the overview shown in FIG. 2A, the user 110a and the user 110b are both wearing the augmented reality display devices 102a and 102b, respectively. In order to illustrate the features of the augmented reality system 100, one or more embodiments described herein are described as the user 110a looking at the user 110b. Thus, for purposes of these embodiments, the user 110b may be referred to as the co-user of the user 110a. In other words, for the purposes of the description herein, the "co-user" is the one for whom the augmented reality system 100 is generating an augmented reality overlay, and the "user" is the one to whom the augmented reality system 100 provides the generated augmented reality overlay. Thus, in FIGS. 2A-2D, the "user" is the user 110a, and the "co-user" is the user 110b.

Figure 2B:
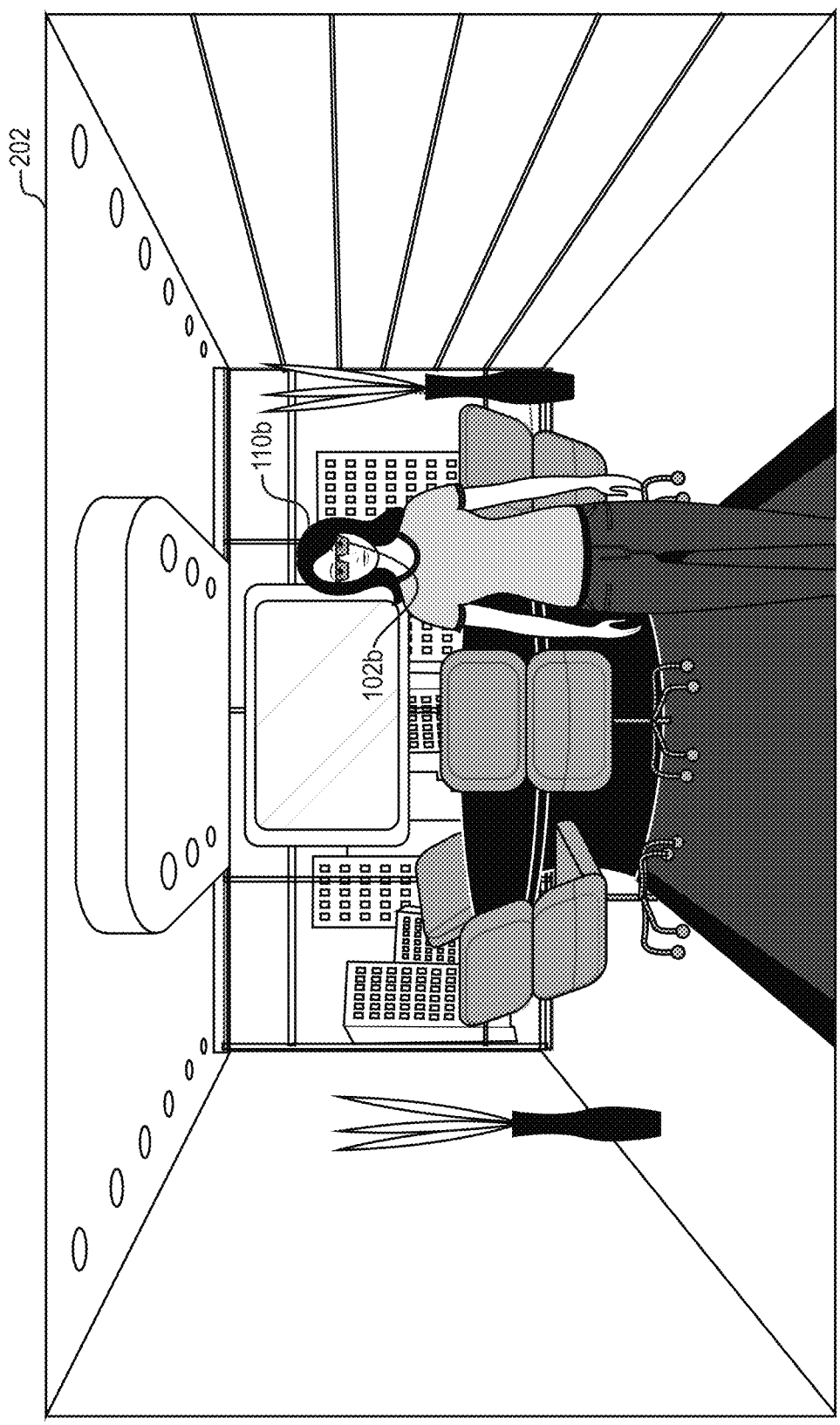

For instance, FIG. 2B illustrates an image 202 of the user 110b captured by the augmented reality display device 102a associated with the user 110a. In other words, the image 202 presents the same view that the user 110a would see the user 110b through the augmented reality display device 102a, prior to activating the augmented reality system 100. In other words, the view 204 is of the user 110b with no additional augmented reality overlay provided by the augmented reality system 100. As shown in FIG. 2B, the user 110b, in real life, is wearing jeans, a t-shirt, and the augmented reality device 102b. In one or more embodiments and in response to the user 110a activating the augmented reality system 100, the augmented reality display device 102a provides the image 202 to the augmented reality system 100.

As mentioned above, the user 110a activates the augmented reality system 100 in order to view an augmented reality overlay in connection with the user 110b. In one or more embodiments, the augmented reality system 100 activates in response to the user 110a powering on the augmented reality display device 102a. Additionally or alternatively, the augmented reality system 100 may activate in response to determining that the user 110a is looking at another person (e.g., by monitoring the eyes of the user 110a, by performing image analysis in connection with an image captured by the augmented reality display device 102a, etc.).

Upon activating, the augmented reality system 100 first determines whether the user 110b is an augmented reality system user. In one or more embodiments, the augmented reality system 100 determines whether the user 110b is an augmented reality system user by determining the identity of the user 110b. For example, in at least one embodiment, the augmented reality display device 102a provides at least one captured image including the user 110b (e.g., the image 202) to the augmented reality system 100. The augmented reality system 100 then utilizes facial recognition techniques, image matching, eye scanning, etc. in connection with the provided image in order to identify the user 110b. For instance, the augmented reality system 100 can utilize facial recognition techniques to match the image of the user 110b to an existing profile picture within the networking system 108.

In one or more embodiments, in response to determining the user 110b is an augmented reality system user, the augmented reality system 100 performs a threshold determination as to the initial appearance of the user 110b. For example, in some instances, the user 110b may be appropriately attired for the location and setting in which the augmented reality system 100 activated. In that case, the augmented reality system 100 may determine to exit the process of generating an augmented reality system overlay for the user 110b. Alternatively, if the user 110b is wearing appropriate attire, the augmented reality system 100 may generate a partial augmented reality system overlay that includes other augmented reality elements other than clothing elements. In one or more embodiments, the augmented reality system 100 performs this threshold determination using computer vision techniques, image comparisons, Internet searches, and other machine learning techniques.

In at least one embodiment, the augmented reality system 100 determines that the user 110b is not a user of the augmented reality system 100. For example, the user 110b is not a networking system user, and/or has not opted into the features of the augmented reality system 100. If the user 110b is not a user of the augmented reality system 100, the augmented reality system 100 may provide no augmented reality overlay for display in association with a view of the user 110b. Alternatively, the augmented reality system 100 may provide a default augmented reality overlay that is appropriate to the location and setting of the user 110a. In one or more embodiments, the default augmented reality overlay may include simple attire with no extra enhancements.

In response to determining the identified user 110b is a user of the augmented reality system 100 (e.g., the user 110b has a networking system account and has opted in to the features of the augmented reality system 100), the augmented reality system 100 performs a three-dimensional scan of the user 110b displayed the image provided by the augmented reality display device 102a. As mentioned above, the augmented reality system 100 utilizes the three-dimensional scan of the user 110b in order to build a graphical mesh that represents the three-dimensional shape of the user 110b. Later, the augmented reality system 100 will utilize the graphical mesh to generate an augmented reality overlay for the user 110b.

In one or more embodiments, the augmented reality system 100 next determines the location and setting of the augmented reality display devices 102a and 102b. As mentioned above, in one or more embodiments, the augmented reality display devices 102a, 102b provide location information to the augmented reality system 100 including, but not limited to, GPS data, WiFi data, biometric data (e.g., a step count), and so forth. Utilizing this location information in combination with map data, networking system information, Internet searches, and so forth, the augmented reality system 100 determines the location of the augmented reality display devices 102a, 102b.

In at least one embodiment, the augmented reality system 100 calculates a confidence score related to the determined location of the augmented reality display devices 102a, 102b. For example, in one embodiment, the augmented reality display devices 102a, 102b are located on a certain floor of a building with many floors. Thus, it may be difficult for the augmented reality system 100 to determine, based on GPS data, exactly where in the building the augmented reality display devices 102a, 102b are located. Accordingly, the augmented reality system 100 can utilize other types of location information (e.g., networking system event information that the user 110a has saved within the networking system 108 for the current date and time) to fine-tune the determined location of the augmented reality display devices 102a, 102b. As the augmented reality system 100 supplements GPS data with other types of location information, the augmented reality system 100 can determine a level of confidence, or confidence score, that indicates how likely the determined location of the augmented reality display devices 102a, 102b is correct. If the augmented reality system 100 calculates a confidence score that is below a threshold amount, the augmented reality system 100 can prompt the user 110a to confirm his location, or to provide additional location information.

The augmented reality system 100 can further determine the setting associated with the augmented reality display devices 102a, 102b. For example, in one or more embodiments, the augmented reality system 100 utilizes image analysis in connection with the image captured by the augmented reality display device 102a to determine whether the augmented reality display devices 102a, 102b are located in a formal or informal setting, in a business or casual setting, in a public or private setting, and so forth. In determining the setting associated with the augmented reality display devices 102a, 102b, the augmented reality system 100 further informs the appropriate selection of augmented reality elements for inclusion in the augmented reality overlay, as will be described further below. The augmented reality system 100 can further utilize networking system information, Internet searches, and so forth in determining the setting within a predetermined degree of confidence, as described above.

To illustrate the location and setting determination performed by the augmented reality system 100, FIG. 2B shows an image 202 captured by the augmented reality display device 102a. In other words, the image 202 includes what the user 110a is seeing via the augmented reality display device 102a. Accordingly, the augmented reality display device 102a provides the image 202 to the augmented reality system 100, along with other location information as described above. As further described above, the augmented reality system 100 performs object analysis to identify a conference room table and chairs, a white board, and so forth. From these details, in combination with the other location information provided by the augmented reality display device 102a, the augmented reality system 100 determines that the augmented reality display devices 102a, 102b are located in the board room of a company, and that the users 110a, 110b are attending a board meeting.

In response to determining the location and setting of the augmented reality display devices 102a, 102b and that the user 110b is an augmented reality system user, the augmented reality system 100 next identifies a collection of augmented reality elements that are appropriate to that location and setting. As described above, the augmented reality system 100 begins the process of generating an augmented reality overlay by identifying appropriate augmented reality elements relative to the location and setting of the augmented reality display devices 102a, 102b. Accordingly, in response to determining that the augmented reality display devices 102a, 102b are located at a business and that the users 110a, 110b are attending a board meeting, the augmented reality system 100 can collect appropriate augmented reality elements. For example, the augmented reality system 100 may collect augmented reality elements representing business attire (e.g., suits, blouses, skirts, slacks, etc.), hairstyles, jewelry, and so forth.

After identifying a collection of appropriate augmented reality elements, the augmented reality system 100 begins to narrow the collection by applying any rules or preferences pre-defined by the user 110b. For example, in at least one embodiment, upon initially opting into the services and features of the augmented reality system 100, the user 110b pre-defined one or more rules and/or preferences for any future augmented reality overlays that would be displayed in combination with a view of her. To illustrate, the user 110b may have configured rules such as: "Always show me in women's clothing," "Never show me wearing orange," "Never change my hair color," and so forth. Similarly, the user 110b may have configured preferences such as: "I prefer to wear darker colors," "I prefer conservative hairstyles," "I prefer to wear mid-range fashion," and so forth. Accordingly, in at least one embodiment, the augmented reality system 100 applies any pre-configured rules or preferences to the collection of appropriate augmented reality elements and calculates an initial score for each element in the collection based on the applied rules or preferences.

Next, in one or more embodiments, the augmented reality system 100 weights the initial score calculated for each augmented reality element based on networking system information. For example, the augmented reality system 100 adjusts the initial scores based on social networking activity information associated with the user 110b. To illustrate, if the user 110b has previously "liked" a particular fashion designer via the networking system 108, the augmented reality system 100 adds an amount to the initial score calculated for elements representing attire associated with that fashion designer. Similarly, if the user 110b as previously posted via the networking system 108 that she dislikes gaudy jewelry, the augmented reality system 100 subtracts an amount from the initial score calculated for elements representing large and flashy jewelry.

As mentioned above, in at least one embodiment, the augmented reality system 100 further weights the score calculated for each identified augmented reality element based on a networking system coefficient between the user 110a and the user 110b. For example, in one or more embodiments, the networking system coefficient is a numerical representation of the strength of the relationship between the users 110a and 110b via the networking system 108. To illustrate, in one embodiment the relationship coefficient between the users 110a and 110b is high. If the networking system activity history associated with the user 110a indicates an affinity for a particular clothing style, the augmented reality system 100 can add a certain amount to score for identified augmented reality elements representing pieces of clothing in that clothing style, even though the augmented reality system 100 is calculating the score for those augmented reality elements relative to the user 110b.

After calculating a score for each of the collection of identified augmented reality elements, the augmented reality system 100 begins building an augmented reality overlay for the user 110b. For example, the augmented reality system 100 identifies the highest scoring augmented reality elements to attach to the graphical mesh in order to build the augmented reality overlay. In one or more embodiments, the augmented reality system 100 attaches the highest scoring augmented reality elements to the graphical mesh based on a set of reality-based rules. For instance, the augmented reality system 100 may operate under reality-based rules including rules that dictate how many articles of clothing a person can wear (e.g., "a person can only wear one pair of pants at a time,"), modesty rules (e.g., "a person's swimsuit areas must be covered"), and so forth. Thus, the augmented reality system 100 can attach the highest scoring augmented reality element to the graphical mesh, then continue to the next highest scoring augmented reality element based on the reality-based rules, and so on until a threshold number of augmented reality elements have been attached. For example, the user 110b may have previously specified a maximum number of augmented reality elements that can be included in an augmented reality overlay, of the augmented reality system 100 may stop attaching augmented reality elements to the graphical mesh when a threshold percentage of the graphical mesh has been covered.

In one or more embodiments, the augmented reality system 100 attaches an augmented reality element to the graphical mesh by first determining where on the graphical mesh the element should be attached. For example, in one embodiment, each augmented reality element is associated with metadata that specifies a body area where the augmented reality element should be attached. Based on this information, the augmented reality system 100 attaches the augmented reality element to the appropriate area within the graphical mesh. Next, the augmented reality system 100 contours the attached element to the graphical mesh such that the graphical mesh appears to be "wearing" the attached element. For example, the augmented reality system 100 can shorten trousers, lengthen sleeves, widen waistbands, adjust hairlines, etc.

Once the augmented reality system 100 has attached the appropriate number of augmented reality elements to the graphical mesh, the augmented reality overlay is built, and the augmented reality system 100 can provide the augmented reality overlay to the augmented reality display device 102a. In response to receiving the augmented reality overlay, the augmented reality display device 102a anchors the augmented reality overlay within a view of the user 110b, such that the user 110b appears to be wearing the augmented reality overlay. In other words, the augmented reality display device 102a displays the augmented reality overlay such that portions of the user 110b are completely obscured by the augmented reality overlay.

To illustrate, as shown in FIG. 2B, the user 110b is wearing jeans and a t-shirt, in addition to the augmented reality display device 102b. In response to performing the analysis and selection process described above, the augmented reality system 100 builds and provides the augmented reality overlay 206a, which the augmented reality display device 102a anchors within the view 204 of the user 110b. As shown in FIG. 2B, the augmented reality display device 102*a* anchors the augmented reality overlay 206*a* such that portions of the user 110*b* are completely obscured.

Figure 2C:
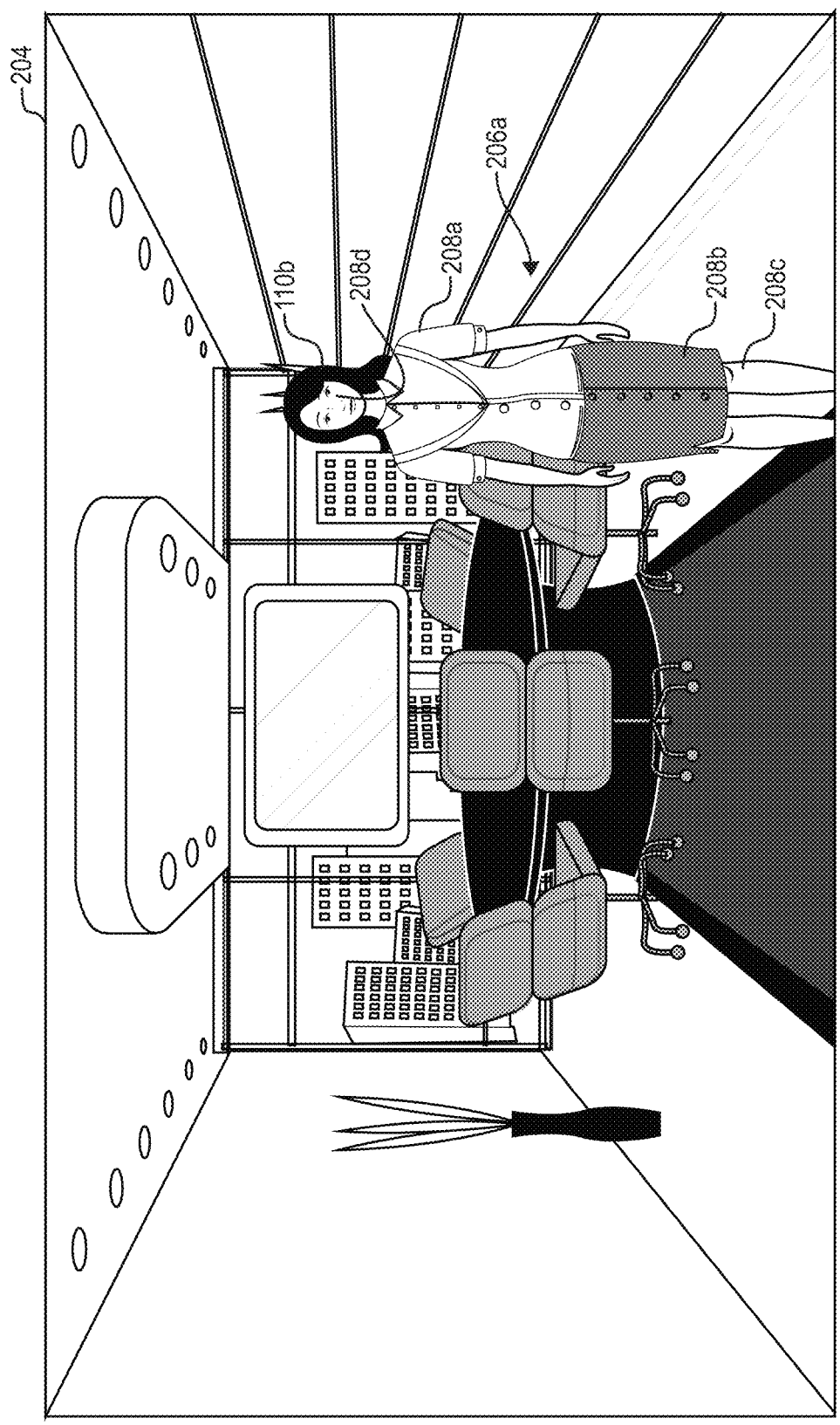

For example, in response to analyzing the location, setting, and networking system information described above, the augmented reality system 100 has built the augmented reality overlay 206*a* out of the augmented reality elements 208*a*, 208*b*, 208*c*, and 208*d*. As shown in FIG. 2C, the augmented reality element 208*a* represents an office-appropriate blouse, and the augmented reality element 208*b* represents a similarly appropriate skirt.

As mentioned above, in some embodiments, an augmented reality element may be an effect rather than a digital representation of an item (e.g., a blouse, a skirt, etc.). For example, as shown in FIG. 2C, the augmented reality element 208*c* is a pair of uncovered legs. As shown in FIG. 2B, in real-life the user 110*b* is wearing jeans (e.g., as shown in FIG. 2B). Thus, in order for her to appear to be wearing a skirt, the augmented reality system 100 included the augmented reality element 208*c*. In one or more embodiments, the augmented reality system 100 performs skin tone matching when attaching this type of augmented reality element to the graphical mesh associated with the user 110*b*.

Similarly, the augmented reality element 208*d* is a skin-tone overlay that covers the augmented reality display device 102*b* (as shown in FIG. 2B). For example, the user 110*b* may have pre-defined a preference that states she prefers to be shown without any eyewear. Accordingly, the augmented reality system 100 performs skin tone matching when attaching this type of augmented reality element to the graphical mesh associated with the user 110*b*. Similarly, the augmented reality system 100 may determine the shape and color of her eyes by analyzing networking system information (e.g., profile pictures, etc.). By utilizing the graphical mesh representing the 3-dimensional shape of the user 110*b*, the augmented reality overlay 206*a* appears within the view 204 to closely approximate the shape and contours of the user 110*b* such that the resulting effect is not distracting to the user 110*a* and the user 110*b* appears to be wearing an entirely different outfit that is appropriate to the location and setting of both of the users 110*a*, 110*b*.

As discussed above, the augmented reality system 100 enables a user to move from one event to the next without having to worry about changing clothes, re-doing makeup, shaving, fixing hair, and so forth. For example, in one embodiment, the users 110*a* and 110*b* traveled directly from the board meeting (e.g., described with reference to FIGS. 2B and 2C) out to have drinks at an upscale bar. Accordingly, in response to identifying a new location and setting (e.g., an upscale bar in the evening), the augmented reality system 100 generates a new augmented reality overlay for the user 110*b*, in the manner described above, with augmented reality elements that are appropriate to the new location and setting.

Figure 2D:
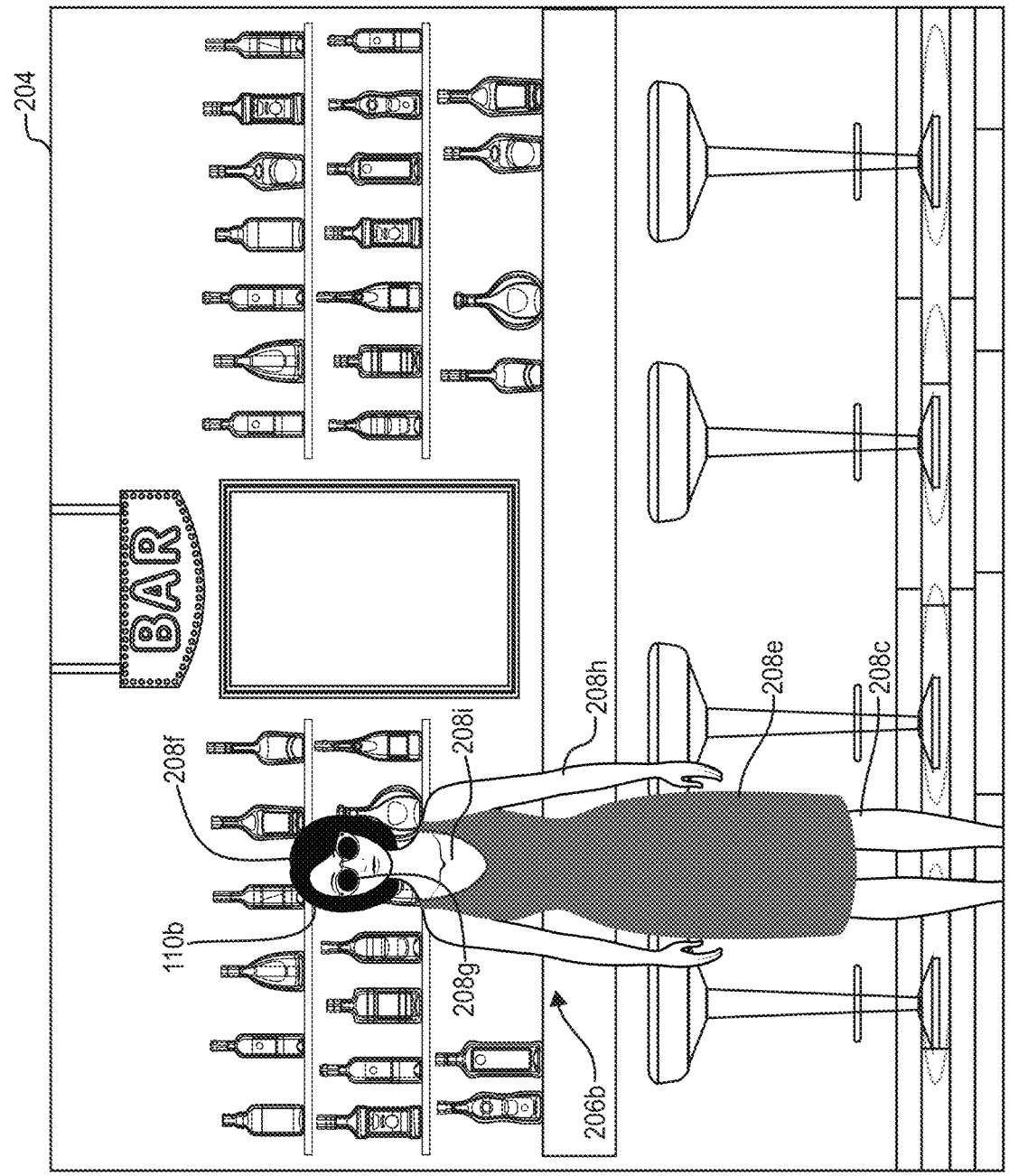

For example, as shown in FIG. 2D, the augmented reality system 100 provides the augmented reality overlay 206*b* to the augmented reality display device 102*a* to be anchored on the view 204 of the user 110*b*. As shown, the augmented reality overlay 206*b* includes the augmented reality elements 208*c*, 208*e*, 208*f*, 208*g*, and 208*h*. In response to determining that the augmented reality overlay 206*b* would include the augmented reality element 208*e* (e.g., a sleeveless dress), the augmented reality system 100 has also included the augmented reality element 208*c* (e.g., bare legs), the augmented reality element 208*h* (e.g., bare shoulders), and the augmented reality element 208*i* (e.g., décolletage) in the augmented reality overlay 206*b*.

Additionally, based on a combination of user preferences and other networking system information (e.g., networking system activity information indicating the user 110*b* has "liked" a picture showing a bobbed haircut), the augmented reality system 100 has also included the augmented reality element 208*f*. As shown in FIG. 2D, the augmented reality element 208*f* is an effect that causes the hairstyle of the user 110*b* to change from long and wavy to bobbed and straight. Similarly, based on a combination of user preferences and other networking system information (e.g., networking system activity information indication the user 110*b* has frequently "liked" pictures of a celebrity who always wears sunglasses in public), the augmented reality system 100 has included the augmented reality element 208*g*, which changes the appearance of the augmented reality display device 102*b* to appear like sunglasses.

As described above, the augmented reality display device 102*a* anchors the augmented reality overlay 206*b* within the view 204 of the user 110*b* such that any movement within the view 204 is compensated for. For example, the augmented reality display device 102*a* can detect movements of the user 110*a* and/or the user 110*b* and can reposition the augmented reality overlay 206*b* in a corresponding manner such that portions of the user 110*b* are effectively obscured. Thus, from the perspective of the user 110*a*, the user 110*b* appears to be wearing a cocktail dress in a look that is appropriate for this new location and setting.

Figure 3A:
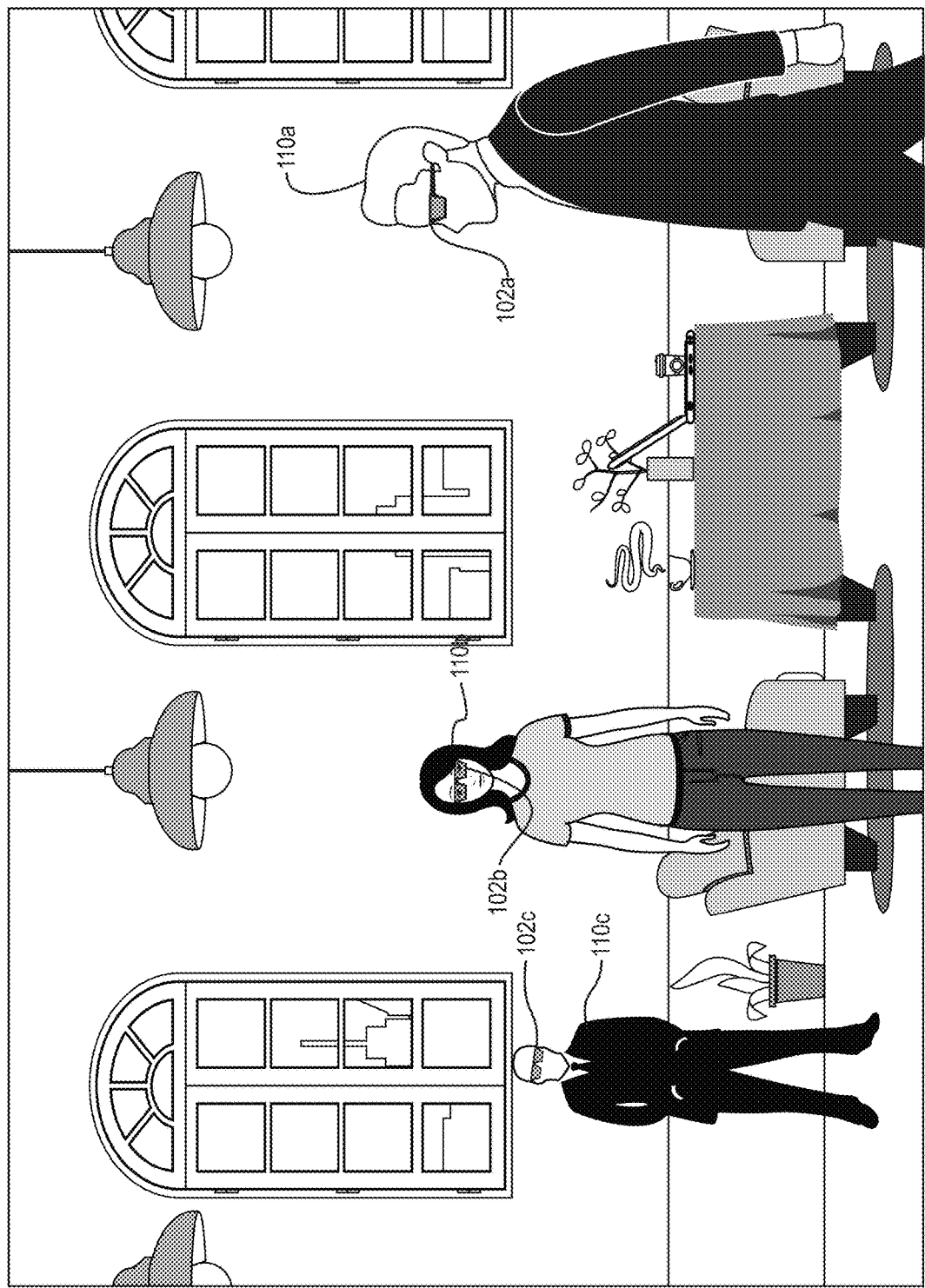
FIGS. 3A-3C illustrate a series of views illustrating various features in accordance with one or more embodiments.

In one or more embodiments, the augmented reality system 100 generates different augmented reality overlays for the same person depending on the other augmented reality system users who are looking at that person. For example, as illustrated in FIG. 3A, the users 110*a*, 110*b*, and 110*c* may be in the same location and setting. Even though the users 110*a*, 110*b*, and 110*c* are similarly located, the networking system relationship coefficient between the user 110*a* and the user 110*b* may be different from the networking system relationship coefficient between the user 110*c* and the user 110*b*. For instance, the user 110*a* may be the employer of the user 110*b*, while the user 110*c* is a long-time friend of the user 110*b*. Accordingly, in that embodiment, the networking system relationship coefficient between the user 110*b* and the user 110*c* is higher than the networking system relationship coefficient between the user 110*b* and the user 110*a*. Thus, when both the users 110*a* and 110*c* are looking at the user 110*b* through the augmented reality display devices 102*a* and 102*c*, respectively, the augmented reality system 100 can generate two different augmented reality overlays associated with the user 110*b*.

Figure 3B:
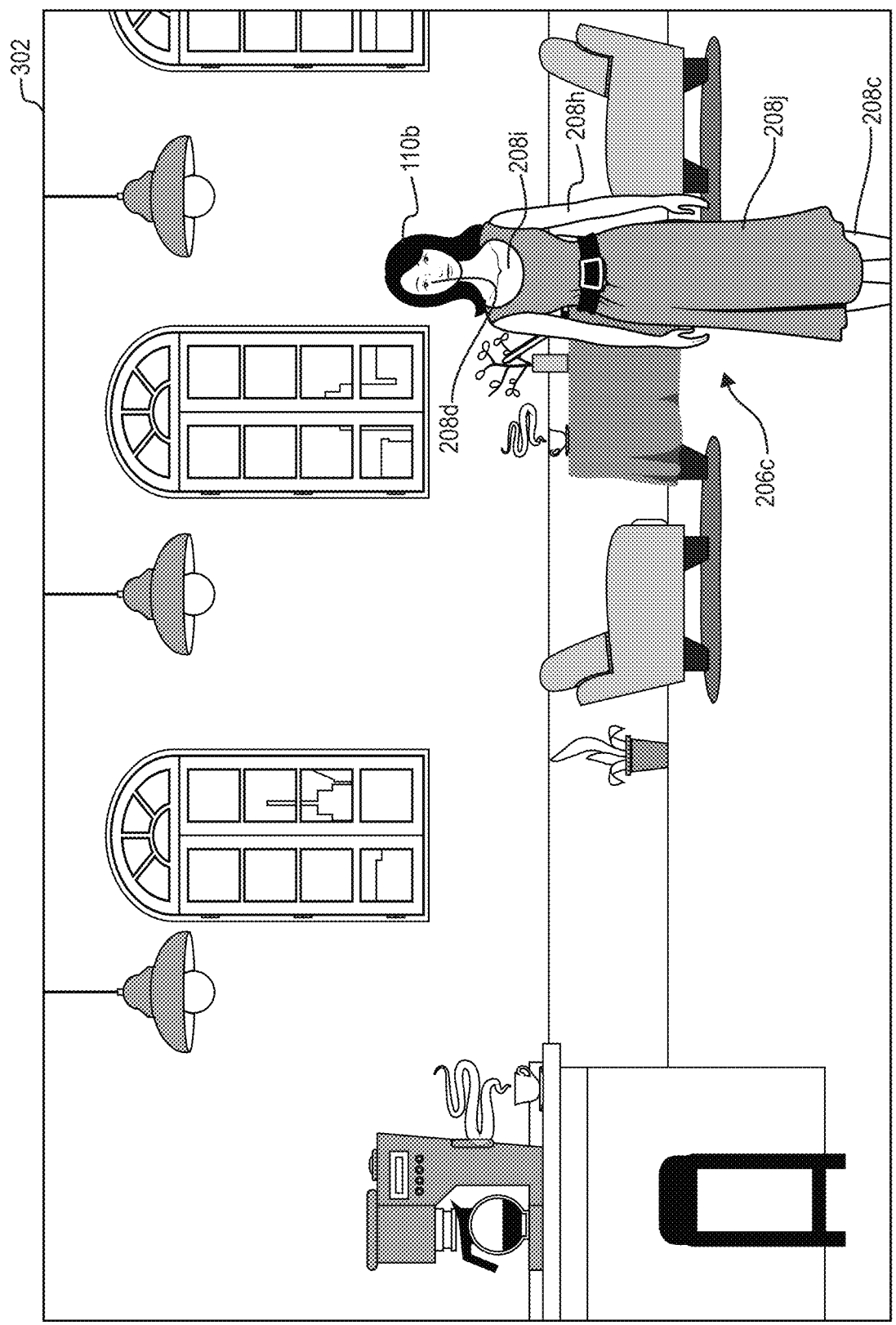

For example, after performing the analysis of the location, setting, and networking system information described above in combination with the relationship coefficient between the user 110*a* and the user 110*b*, the augmented reality system 100 can generate and provide the augmented reality overlay 206*c*, illustrated in FIG. 3B. In FIG. 3B, the augmented reality system 100 anchors the augmented reality overlay 206*c* in the view 302 provided by the augmented reality display device 102*a* associated with the user 110*a*. As shown in FIG. 3B, the augmented reality overlay 206*c* includes the augmented reality elements 208*c*, 208*d*, 208*h*, 208*i*, and 208*j*. As described above with reference to FIGS. 2B and 2C, in response to determining that the augmented reality element 208*j* (e.g., a sleeveless dress) has a calculated score that is high enough to warrant inclusion in the augmented reality overlay 206*c*, the augmented reality system 100 also includes the augmented reality element 208*c* (e.g., bare legs), the augmented reality element 208*h* (e.g., bare shoulders), and the augmented reality element 208*i* (e.g., décolletage) in the augmented reality overlay 206b. Similarly, in response to one or more preferences pre-defined by the user 110b, the augmented reality system 100 also includes the augmented reality element 208d (e.g., an overlay that masks the augmented reality display device 102b worn by the user 110b).

Figure 3C:
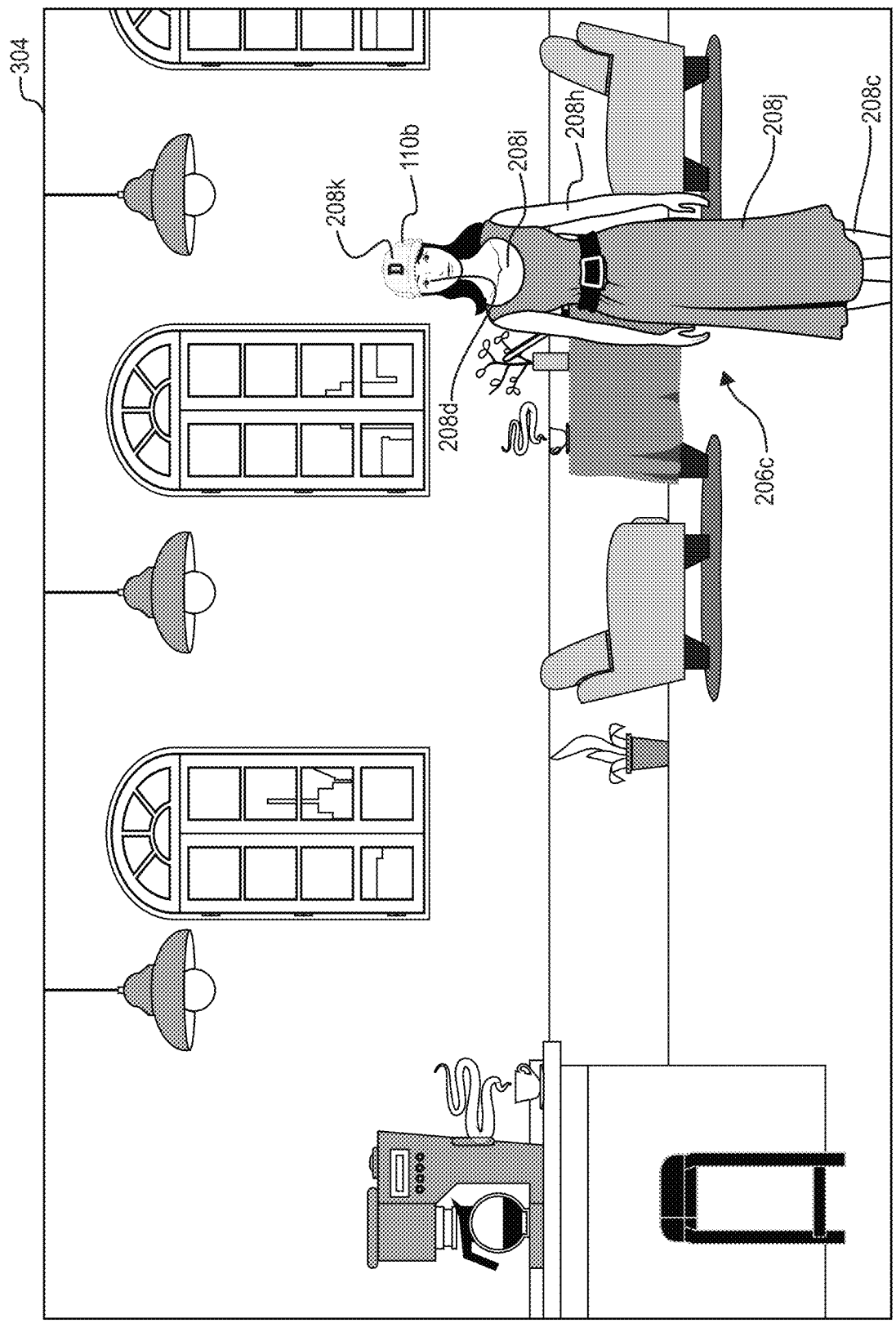

In response to determining that the networking system relationship coefficient between the user 110b and the user 110c is higher, the augmented reality system 100 can generate a different augmented reality overlay for display to the user 110c. Alternatively, in at least one embodiment, the augmented reality system 100 simply adds additional augmented reality elements to a previously generated augmented reality overlay that reflect the closer relationship indicated by the higher relationship coefficient. For example, as illustrated in FIG. 3C, the augmented reality system 100 can add the augmented reality element 208k to the augmented reality overlay 206c anchored within a view 304 of the user 110b provided to the user 110c by the augmented reality display device 102c.

In one or more embodiments, the augmented reality system 100 adds the augmented reality element 208k to the augmented reality overlay 206c in response to determining that the user 110b and the user 110c have a networking system relationship coefficient that is higher than a threshold amount. For example, in at least one embodiment, a relationship coefficient between two users that is higher than the threshold amount indicates to the augmented reality system 100 that the two users have a strong relationship. To illustrate, in one embodiment, the users 110b and 110c have a high relationship coefficient that the augmented reality system 100 has calculated based on the length of their "friendship" via the networking system 108, their frequent shared posts, their frequent shared check-ins, their frequent cross-tags in digital photographs and videos, and so forth. Additionally, the augmented reality system 100 has calculated the high relationship coefficient for the users 110b, 110c based on their profile information that indicates they live in the same area and share an interest in the same sports team. Accordingly, in light of this analysis, the augmented reality system 100 has added the augmented reality element 208k (e.g., a hat featuring the logo of the sports team in which both of the users 110b, 110c are interested) to the augmented reality overlay 206c.

Thus, in one or more embodiments, the augmented reality system 100 provides a unique view to each augmented reality system user. For example, even though the view 302 (e.g., as shown in FIG. 3B) and the view 304 (e.g., as shown in FIG. 3C) are of the same user (e.g., the user 110b) at the same time and in the same place, the augmented reality system 100 provides a different combination of augmented reality elements in the displayed overlay. In at least one embodiment, if there is no relationship coefficient between a group of augmented reality users (e.g., no one in the group shares any networking system activity or information), the augmented reality system 100 may provide the same augmented reality elements in an augmented reality overlay for a particular member of the group. In that embodiment, that particular member would appear the same to every other group member who looks at her.

As mentioned above, the augmented reality system 100 also provides voice translation services. For example, the augmented reality system 100 includes a machine translator that analyzes an audio stream for spoken words, determines the language associated with the words, translates the words into a different language, and provides an audio stream of the spoken translated words. In at least one embodiment, the augmented reality system 100 determines the language associated with an incoming audio stream and the appropriate translated language based, at least in part, on networking system information.

To illustrate, the user 110a may speak French while the user 110b speaks English. In one or more embodiments, the augmented reality system 100 determines the languages of the user 110a and the user 110b based on their networking system profile information, their networking system check-ins, their networking system posts, their networking system comments, and so forth. Accordingly, when the augmented reality display device 102a provides an image including the user 110b to the augmented reality system 100, the augmented reality system 100 can perform translation services utilizes the audio stream provided by the augmented reality display device 102a. The augmented reality system 100 then provides an audio stream of translated speech back to the augmented reality display device 102a for playback to the user 110a.

Further, in one or more embodiments, when providing an audio stream of translated speech, the augmented reality system 100 can also include an augmented reality element in an augmented reality overlay that is associated with the translation. For example, in one embodiment, in response to providing an audio stream of translated speech to the augmented reality display device 102a, the augmented reality system 100 provides an augmented reality element that makes it appear like the mouth of the user 110b is synchronized to the translated speech.

Figure 4:
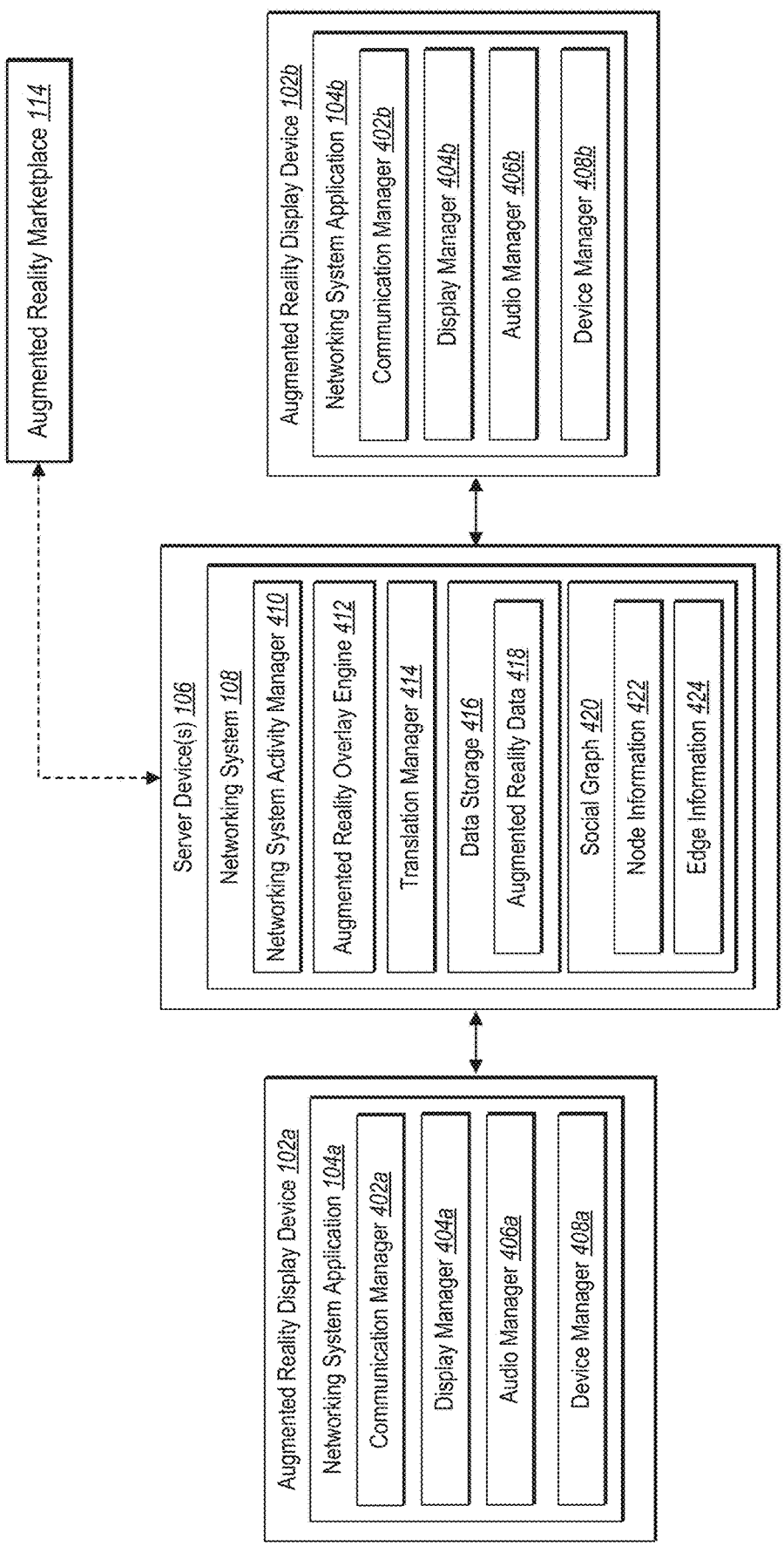
FIG. 4 illustrates a detailed schematic diagram of the augmented reality system in accordance with one or more embodiments.

As discussed above, the systems and methods laid out with reference to FIGS. 1-3 provide a augmented reality overlay for a networking system user, such that the user appears to others to be in the correct attire and speaking the correct language for a given situation. FIG. 4 illustrates a schematic diagram illustrating another example embodiment of the augmented reality system 100. As shown in FIG. 4, the augmented reality system 100 includes, but is not limited to, the augmented reality display devices 102a, 102b, the server device(s) 106, and the augmented reality marketplace 114. In one or more embodiments, the augmented reality display devices 102a, 102b include networking system applications 104a, 104b, respectively. As shown in FIG. 4, the networking system application 104a, 104b includes a communication manager 402a, 402b, a display manager 404a, 404b, an audio manager 406a, 406b, and a device manager 408a, 408b. Furthermore, in one or more embodiments, the augmented reality display devices 102a, 102b include an audio/visual transmission device, an augmented reality display, a video capturing device, and an audio playback device.

Additionally shown in FIG. 4, the server device(s) 106 hosts the networking system 108. In one or more embodiments, the networking system 108 includes a networking system activity manager 410, an augmented reality overlay engine 412, a translation manager 414, and a data storage 416. As shown in FIG. 4, the data storage 416 includes augmented reality data 418.

In at least one embodiment, the augmented reality system 100 accesses the networking system 108 in order to identify and analyze networking system user data. Accordingly, the networking system 108 includes a social graph 420 for representing a plurality of users, actions, and concepts. In one or more embodiments, the social graph 420 includes node information 422 and edge information 424. Node information 422 of the social graph 420 stores information including, for example, nodes for users and nodes for repositories. Edge information 424 of the social graph 420 stores information including relationships between nodes and/or actions occurring within the networking system 108. Further details regarding the networking system 108, the social graph 420, edges, and nodes are presented below with respect to FIG. 8.

Each of the components 410-420 of the networking system 108 can be implemented using a computing device including at least one processor executing instructions that cause the augmented reality system 100 to perform the processes described herein. In some embodiments, the networking system components described herein can be implemented by the server device(s) 106, or across multiple server devices. Additionally or alternatively a combination of one or more server devices and one or more client-computing devices can implemented components of the networking system 108. Additionally or alternatively, the components described herein can comprise a combination of computer-executable instructions and hardware.

As mentioned above, and as shown in FIG. 4, the networking system application 104a, 104b includes the communication manager 402a, 402b. In one or more embodiments, the communication manager 402a, 402b sends and receives data to and from the networking system 108. For example, the communication manager 402a, 402b sends data to the networking system 108 including a video stream or an image captured by the video capturing device of the augmented reality display device 102a, 102b. Additionally, the communication manager 402a, 402b sends other types of information, such as GPS data associated with the augmented reality display device 102a, 102b. Further, the communication manager 402a, 402b receives data from the networking system 108 including a augmented reality overlay associated with another augmented reality system user at whom the user of the augmented reality display device 102a, 102b is looking. In at least one embodiment, the communication manager 402a, 402b also receives data from the networking system 108 including an audio stream of translated speech and/or other sounds (e.g., ambient sounds, music, etc.).

As shown in FIG. 4, and as mentioned above, the networking system application 104a, 104b includes the display manager 404a, 404b. In one or more embodiments, the display manager 404a, 404b anchors a received augmented reality overlay within the augmented reality display. For example, in order to effectively mask some or all of a user's appearance as viewed through the augmented reality display, the display manager 404a, 404b can determine where to anchor the received augmented reality overlay by utilizing pattern or shape matching (e.g., matching the shape of the augmented reality overlay to the shape of the user).

After anchoring the augmented reality overlay, the display manager 404a, 404b also displays the augmented reality overlay. For example, in one or more embodiments, the display manager 404a, 404b displays the augmented reality overlay within the augmented reality display device 102a, 102b by projecting the augmented reality overlay onto a lens or screen associated with the augmented reality display device 102a, 102b. Regardless of the display method utilized by the display manager 404a, 404b, the display manager 404a, 404b displays the augmented reality overlay such that a view of the surrounding environment through the display of the augmented reality display device 102a, 102b is not obstructed.

Once the display manager 404a, 404b determines where to anchor the augmented reality overlay, the display manager 404a, 404b continues to display the augmented reality overlay while compensating for movement in the display. For example, the user of the augmented reality display device 102a may move his head slightly while looking at the user of the augmented reality display device 102b. Accordingly, the display manager 404a senses the movement (e.g., by image analysis, by gyroscope, etc.), and repositions the augmented reality overlay within the augmented reality display of the augmented reality display device 102a. In this way, the display manager 404a, 404b ensures correct positioning of a augmented reality overlay within the augmented reality display regardless of any movement of the augmented reality display device 102a, 102b.

As shown in FIG. 4, and as mentioned above, the networking system application 104a, 104b includes the audio manager 406a, 406b. In one or more embodiments, the audio manager 406a, 406b provides audio through an audio playback device associated with the augmented reality display device 102a, 102b (e.g., headphones, etc.) that is received from the networking system 108. As mentioned above, in some embodiments, the augmented reality system 100 provides real-time language translation. For example, a first user may speak to a second user in Russian. The augmented reality system 100 can utilize networking system information associated with the second user to determine that the second user only speaks English, and can provide an English translation to the second user of what the first user is saying in Russian. Accordingly, in one or more embodiments, the audio manager 406a, 406b plays a received audio stream including machine translated synthetic speech to the user of the augmented reality display device 102a, 102b via an audio playback device associated with the augmented reality display device 102a, 102b.

In some embodiments, the audio manager 406a, 406b also performs noise cancelation in connection with an audio playback device associated with the augmented reality display device 102a, 102b. In order to prevent a first user from hearing both machine translated speech and the voice of the second user (e.g., the user whose speech is being translated), the audio manager 406a, 406b can provide noise cancelation in addition to the playback of the audio stream provided by the networking system 108. In one or more embodiments, the noise cancelation effectively mutes any background sounds that may interference with the sound quality of the incoming audio stream.

As shown in FIG. 4, and as mentioned above, the networking system application 104a, 104b includes a device manager 408a, 408b. In one or more embodiments, the device manager 408a, 408b handles auxiliary features of the augmented reality display device 102a, 102b that are necessary to the operation of the augmented reality system 100. For example, in one embodiment, the augmented reality system 100 utilizes global positioning satellite ("GPS") data associated with the augmented reality display device 102a, 102b to determine where an augmented reality system 100 user is currently located. Accordingly, the device manager 408a, 408b queries location data from a GPS unit associated with the augmented reality display device 102a, 102b. In additional or alternative embodiments, the device manager 408a, 408b queries and communicates data including, but not limited to, WiFi data, battery usage data, and so forth.

Also shown in FIG. 2, and mentioned above, the server device(s) 106 hosts the networking system 108. The networking system 108 generates and provides augmented reality overlays to the augmented reality display devices 102a, 102b. Additionally, the networking system 108 provides conventional networking system features such as, but not limited to, newsfeeds, posts, electronic messages, and so forth. For example, the networking system 108 can provide a networking system user with a newsfeed including posts submitted by the user's networking system "friends."

Further shown in FIG. 2, the networking system 108 includes the networking system activity manager 410. As mentioned above, the augmented reality system 100 automatically generates an augmented reality overlay associated with a user based, in part, on the user's networking system activities. For example, the user may engage in networking activities such as, but not limited to, submitting posts, sharing posts, liking posts, submitting and watching live video, commenting on posts and digital media, messaging other users, checking in at locations, tagging other users in posts, submitting payments, etc. In one or more embodiments, the networking system activity manager 410 monitors and tracks all networking system activities engaged in by a networking system user.

The networking system activity manager 410 also calculates a networking system relationship coefficient between two users. As mentioned above, the augmented reality system 100 can generate different augmented reality overlays for a user depending on who is looking at him. For example, the augmented reality system 100 provides a different augmented reality overlay to the user's employer than the augmented reality overlay provided to the user's friend, even though the user, his friend, and his employer are all at the same location. In one or more embodiments, the networking system activity manager 410 calculates a relationship coefficient between two users based on the networking system activity the two users have in common. For example, the networking system activity manager 410 may calculate a high relationship coefficient for two users who frequently tag each other in posts, check-in at the same locations at the same times, share each other's posts, and so forth.

The networking system activity manager 410 can also take additional information into account when calculating a relationship coefficient. For example, the networking system activity manager 410 can analyze profile and account information for both users. In one or more embodiments, the users' profile and account information may include relationship information (e.g., the users are related), the length of their "friendship" (e.g., they have been friends via the networking system 108 for a given amount of time), how many networking system friends the users have in common, etc.

As shown in FIG. 4, and as mentioned above, the networking system 108 includes the augmented reality overlay engine 412. In one or more embodiments, the augmented reality overlay engine 412 handles all tasks related to building and providing an augmented reality overlay to a networking system user. For example, in at least one embodiment, the augmented reality overlay engine 412 performs facial recognition on an image from a received video stream in order to identify a networking system user. As discussed above, the networking system 108 receives a video stream or single image from the augmented reality display device 102a (e.g., including whatever the user of the augmented reality display device 102a is looking at). Accordingly, the augmented reality overlay engine 412 extracts an image frame from the video stream and utilizes various computer vision techniques to determine whether the image frame includes a person. If the image frame includes a person, the augmented reality overlay engine 412 performs facial recognition to determine whether the person in the image frame is a networking system user. If the augmented reality overlay engine 412 is unable to match the person in the image frame to any image of a networking system user, the augmented reality overlay engine 412 does not continue in the process of generating a augmented reality overlay. Alternatively, the augmented reality overlay engine 412 can provide a default augmented reality overlay.

After determining the networking system identity of the person at whom the user of the augmented reality display device 102a is looking (e.g., the person in the image frame from the received video stream), the augmented reality overlay engine 412 performs a 3D scan of the image frame in order to determine the 3-dimensional shape of the person in the image frame. For example, the augmented reality overlay engine 412 creates a point cloud of data from the displayed person's 2-dimensional surface within the image frame. From this point cloud, the augmented reality overlay engine 412 then builds a graphical mesh that represents the displayed person's 3-dimensional shape. This graphical mesh becomes the scaffold to which the augmented reality overlay engine 412 can attach augmented reality elements in order to generate an augmented reality overlay.

Once the graphical mesh for the displayed person is built, the augmented reality overlay engine 412 identifies augmented reality elements to include in a augmented reality overlay for the displayed person (e.g., the user of the augmented reality display device 102b). In one or more embodiments, the process for identifying augmented reality elements begins with identifying augmented reality elements that are appropriate to the location of the augmented reality display devices 102a, 102b. As discussed above, the augmented reality display devices 102a, 102b can provide GPS information, WiFi information, and other location information to the networking system 108. The augmented reality overlay engine 412 utilizes this location information to determine the location of the augmented reality display devices 102a, 102b.

In one or more embodiments, the augmented reality overlay engine 412 utilizes networking system information, Internet lookups, database searches, etc. to identify appropriate augmented reality elements based on the location of the augmented reality display devices 102a, 102b. For example, the augmented reality overlay engine 412 can utilize the GPS location of the augmented reality display devices 102a, 102b in combination with networking system information to determine the augmented reality display devices 102a, 102b are located at a birthday party at an upscale restaurant. In at least one embodiment, the augmented reality overlay engine 412 can analyze web search results (e.g., press articles, digital photographs, patron reviews, etc.) to determine what kinds of attire people generally wear to the upscale restaurant. The augmented reality overlay engine 412 can then select augmented reality elements from a library or collection of augmented reality elements that are similar to those kinds of attire. For instance, the augmented reality overlay engine 412 can select appropriate augmented reality elements by performing image comparisons, analyzing metadata associated with each augmented reality element, and so forth.

At this point in the augmented reality overlay building process, the augmented reality overlay engine 412 may have identified hundreds of augmented reality elements that are appropriate for the location of the augmented reality display devices 102a, 102b. Accordingly, in one or more embodiments, the augmented reality overlay engine 412 narrows the collection of identified augmented reality elements by calculating a score for each identified augmented reality element that is based on user preferences, networking system information, and a networking system relationship coefficient between the users of the augmented reality display devices 102a, 102b. The augmented reality overlay engine 412 scores the identified augmented reality elements such that the highest scoring augmented reality elements are most likely to be those the displayed person (e.g., the user of the augmented reality display device 102b) would have chosen himself.

In at least one embodiment, the augmented reality overlay engine 412 begins narrowing the collection of identified augmented reality elements by applying any rules or preferences that have been pre-configured by the displayed person (e.g., the user 110b of the augmented reality display device 102b). As mentioned above, an augmented reality system user can pre-configure rules or preferences that the augmented reality system 100 applies when generating a augmented reality overlay for that user. For example, the user can configure rules or preferences such as: "always show me in tops or dresses with sleeves," "never show me with facial hair," "I don't like heavy makeup," "I typically don't wear grey suits," etc.

Accordingly, in one or more embodiments, the augmented reality overlay engine 412 applies the pre-configured rules or preferences of the displayed person to the identified augmented reality elements in order to determine a score for each of the augmented reality elements. For example, the augmented reality overlay engine 412 can calculate a higher score for those augmented reality elements that are in keeping with the displayed person's rules or preferences. Similarly, the augmented reality overlay engine 412 can calculate a lower score for those augmented reality elements that are not in keeping with the displayed person's rules or preferences. In at least one embodiment, the augmented reality overlay engine 412 removes those elements from the collection of identified augmented reality elements that fail to have a calculated score above a threshold amount. In at least one embodiment, the augmented reality overlay engine 412 calculates a score for an augmented reality element based on rules or preferences by utilizing computer vision in connection with the augmented reality elements, by analyzing metadata associated with the augmented reality elements, by using machine learning techniques, and so forth.

Next, the augmented reality overlay engine 412 weights the calculated scores for the identified augmented reality elements based on the relationship coefficient between the displayed person (e.g., the user of the augmented reality display device 102b) and the user looking at the displayed person (e.g., the user of the augmented reality display device 102a). As discussed above, the networking system activity manager 410 calculates the networking system relationship coefficient between two networking system users based on a variety of factors including, but not limited to, the users' networking system activity history, the users' networking system interactions, the users' networking system profile information, etc. When the relationship coefficient between the users of the augmented reality display devices 102a, 102b is high, the augmented reality overlay engine 412 adds a heavier weight to the scores of augmented reality elements that correlate with networking system information upon which the relationship coefficient was calculated.

In one example, the users of the augmented reality display devices 102a, 102b have a higher relationship coefficient based on networking system information including frequent networking system posts on each other's newsfeeds regarding the same sports team, several check-ins at events for the same sports team, profile information indicating an affinity for the same sports team. Accordingly, when the users of the augmented reality display devices 102a, 102b are at a sports bar on the same night as a game where that particular sports team is playing, the augmented reality overlay engine 412 will add a heavy weight to the calculated scores for augmented reality elements that are associated with that team (e.g., elements that include the team's logo, elements that are the same colors as the team's colors, etc.).

In another example, the users of the augmented reality display devices 102a, 102b have a lower relationship coefficient based on networking system information that indicates the users infrequently interact via the networking system 108, but are employed at the same company. Accordingly, when the users of the augmented reality display devices 102a, 102b are at the sports bar on the same night, the augmented reality overlay engine 412 may only add weight to calculated scores for augmented reality elements that correlate with common interests of users at that location, users who are also employed at the same company as the users of the augmented reality display devices 102a, 102b, and so forth. In this way, the augmented reality system 100 may generate a completely different augmented reality overlay for a user, depending on who is looking at him.

Once the augmented reality overlay engine 412 has calculated weighted scores for each of the identified augmented reality elements, the augmented reality overlay engine 412 can begin building an augmented reality overlay for the displayed person (e.g., the user of the augmented reality display device 102b) with the highest scoring augmented reality elements. For example, in one embodiment, the augmented reality overlay engine 412 selects all augmented reality elements with a weighted score above a threshold amount to include in the augmented reality overlay. In another embodiment, the augmented reality overlay engine 412 selects a top number (e.g., the top ten) of the highest scoring augmented reality elements to include in the augmented reality overlay.

In some embodiments, the augmented reality overlay engine 412 operates under a set of realistic constraints when selecting augmented reality elements to include in the augmented reality overlay. For example, in one embodiment, the highest scoring augmented reality elements may include two dresses. This is problematic because in real-life a person would not wear two dresses at the same time. In order to keep the augmented reality overlay engine 412 from selecting augmented reality elements to include in the augmented reality overlay that are incompatible with each other, the augmented reality overlay engine 412 operates under constraints that are informed by real-world scenarios (e.g., "a person only wears one article of clothing over each area of the body," "a person does not carry an open umbrella indoors," "a person does not wear snow boots in the Summer," etc.). In at least one embodiment, the augmented reality overlay engine 412 is further constrained by general user preferences (e.g., "I want my augmented reality overlays to include no more than five elements").

With an appropriate number of compatible augmented reality elements selected, the augmented reality overlay engine 412 begins building the augmented reality overlay by attaching the augmented reality elements to the display mesh generated for the displayed user (e.g., the user of the augmented reality display device 102b). In one or more embodiments, in order to attach an augmented reality element to the display mesh, the augmented reality overlay engine 412 may resize the augmented reality element, may contour the augmented reality element, may add shadow to a portion of the augmented reality element, and so forth in order to make it appear as though the augmented reality element is being worn. Accordingly, the augmented reality overlay engine 412 continues attaching the augmented reality elements to the display mesh until the augmented reality overlay is completely built. In some embodiments, the augmented reality overlay may only include as little as one augmented reality element. In other embodiments, the augmented reality overlay may include so many augmented reality elements that when overlaid on the displayed person, the augmented reality overlay completely covers portions of the displayed person.

At this point, the augmented reality overlay engine 412 provides the augmented reality overlay to the augmented reality display device 102a to be overlaid on the displayed person within the augmented reality display of the augmented reality display device 102a. As described above, the display manager 404a of the augmented reality display device 102a anchors the augmented reality overlay within the augmented reality display such that the augmented reality overlay moves when the user of the augmented reality display device 102b moves. In this way, from the perspective of the user of the augmented reality display device 102a, the user of the augmented reality display device 102b appears to be attired in whatever augmented reality elements are included in the augmented reality overlay.

As mentioned above, and as illustrated in FIG. 4, the networking system 108 further includes the translation manager 414. In one or more embodiments, the augmented reality system 100 provides translation services that enable the users of the augmented reality display devices 102a, 102b to communicate even if they do not share a language. Accordingly, in at least one embodiment, the translation manager 414 receives an audio stream from the augmented reality display device 102b including the user of the augmented reality display device 102b speaking, and provides an audio stream of translated speech to the augmented reality display device 102a (and vice versa). The translation manager 414 may provide translated audio into various languages based on user settings, or may automatically determine a user's language preferences based on networking system information associated with the user.

Furthermore, in order to aid in the communication between the users of the augmented reality display devices 102a, 102b, the translation manager 414 can generate and add an augmented reality element to the augmented reality overlay generated by the augmented reality overlay engine 412. For example, in one or more embodiments, the translation manager 414 can generate an augmented reality element that looks like the displayed user's mouth. Furthermore, the translation manager 414 can synchronize the generated mouth with the audio stream of translated speech. Thus, when attached to the augmented reality overlay, this augmented reality element makes it appear as though the displayed user is speaking the words included in the audio stream of translated speech. In one or more embodiments, the translation manager 414 generates this augmented reality element by matching the displayed person's skin tone and facial features (e.g., facial hair, mouth shape, birth marks, etc.).

As further shown in FIG. 4, and as mentioned above, the networking system 108 includes the data storage 416. The data storage 416 includes augmented reality data 418. In one or more embodiments, the augmented reality data 418 is representative of augmented reality information (e.g., the library of augmented reality elements, generated augmented reality overlays, user rules and preferences, networking system information), such as described herein.

FIGS. 1-4, the corresponding text and examples, provide a number of different methods, systems, and devices for providing a augmented reality overlay within a view provided by an augmented reality display device. In addition to the foregoing, embodiments can also be described in terms of flowcharts comprising acts and steps in a method for accomplishing a particular result. For example, FIG. 5 may be performed with less or more steps/acts or the steps/acts may be performed in differing orders. Additionally, the steps/acts described herein may be repeated or performed in parallel with one another or in parallel with different instances of the same or similar steps/acts.

Figure 5:
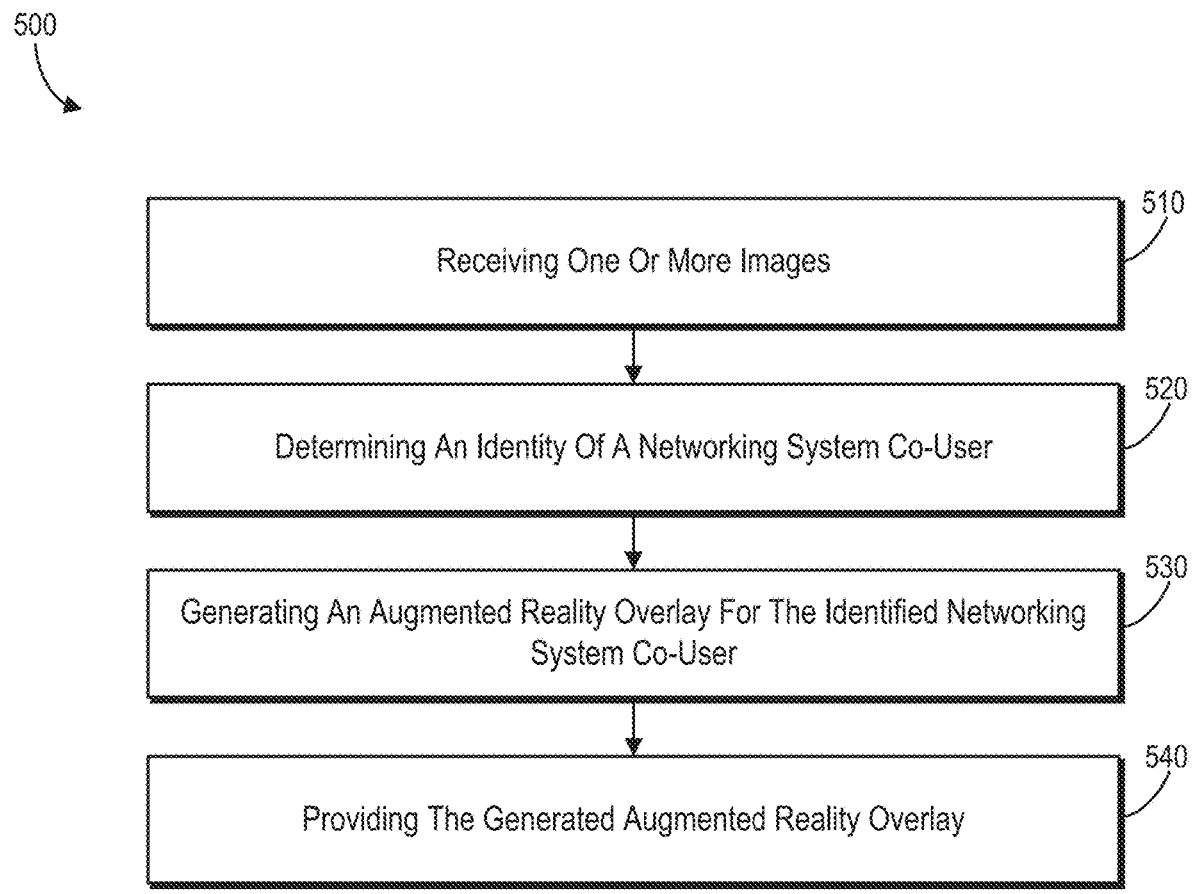
FIG. 5 illustrates a flowchart of a series of acts in a method of displaying an augmented reality overlay on a view of a user in accordance with one or more embodiments.

FIG. 5 illustrates a flowchart of one example method 500 of providing an augmented reality overlay. The method 500 includes an act 510 of receiving one or more images. In particular, the act 510 can involve receiving one or more images captured by an augmented reality display device associated with a networking system user. For example, the one or more images may be captured by a recording device associated with the augmented reality display device.

The method 500 also includes an act 520 of determining an identity of a networking system co-user. In particular, the act 520 can involve determining an identity of a networking system co-user shown in the one or more images. For example, determining an identity of the networking system co-user can include utilizing, in association with the one or more images, one or more of facial recognition techniques, image matching, or eye scanning.

Additionally, the method 500 can include acts of calculating the networking system relationship coefficient associated with the relationship between the networking system user and the networking system co-user, and generating an augmented reality overlay based, at least in part, on the calculated networking system relationship coefficient. For example, calculating the networking system relationship coefficient can include calculating the networking system relationship coefficient based on networking system activity information common between the networking system user and the networking system co-user.

Furthermore, the method 500 includes an act 530 of generating an augmented reality overlay for the identified networking system co-user. In particular, the act 530 can involve generating, based on a relationship between the networking system user and the networking system co-user, an augmented reality overlay for the identified networking system co-user, wherein the augmented reality overlay includes one or more augmented reality elements. In one embodiment, generating the augmented reality overlay for the identified networking system co-user is further based on a location and setting associated with the augmented reality display device. For example, the method 500 can include determining the location and setting associated with the augmented reality display device based on one or more of GPS information, WiFi information, networking system information, and image analysis information from the one or more images.

In one or more embodiments, the method 500 further includes the act of building a graphical mesh based on a three-dimensional scan of the networking system co-user shown in the one or more images. For example, generating the augmented reality overlay for the identified networking system co-user includes identifying one or more augmented reality elements that are appropriate to the location and setting, scoring the identified one or more augmented reality elements based on predefined rules associated with the networking system co-user, and weighting the scores for each of the identified one or more augmented reality elements based on the networking system relationship coefficient, and on the networking system information associated with the networking system co-user. Additionally, generating the augmented reality overlay for the identified networking system co-user can further include identifying a plurality of the scored augmented reality elements with weighted scores above a threshold amount, and attaching the plurality of augmented reality element to the graphical mesh. For instance, attaching the plurality of augmented reality elements to the graphical mesh can include attaching the plurality of augmented reality elements based on a set of reality-based rules that ensure the networking system co-user's appearance is realistic after the augmented reality overlay is displayed on the augmented reality display device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
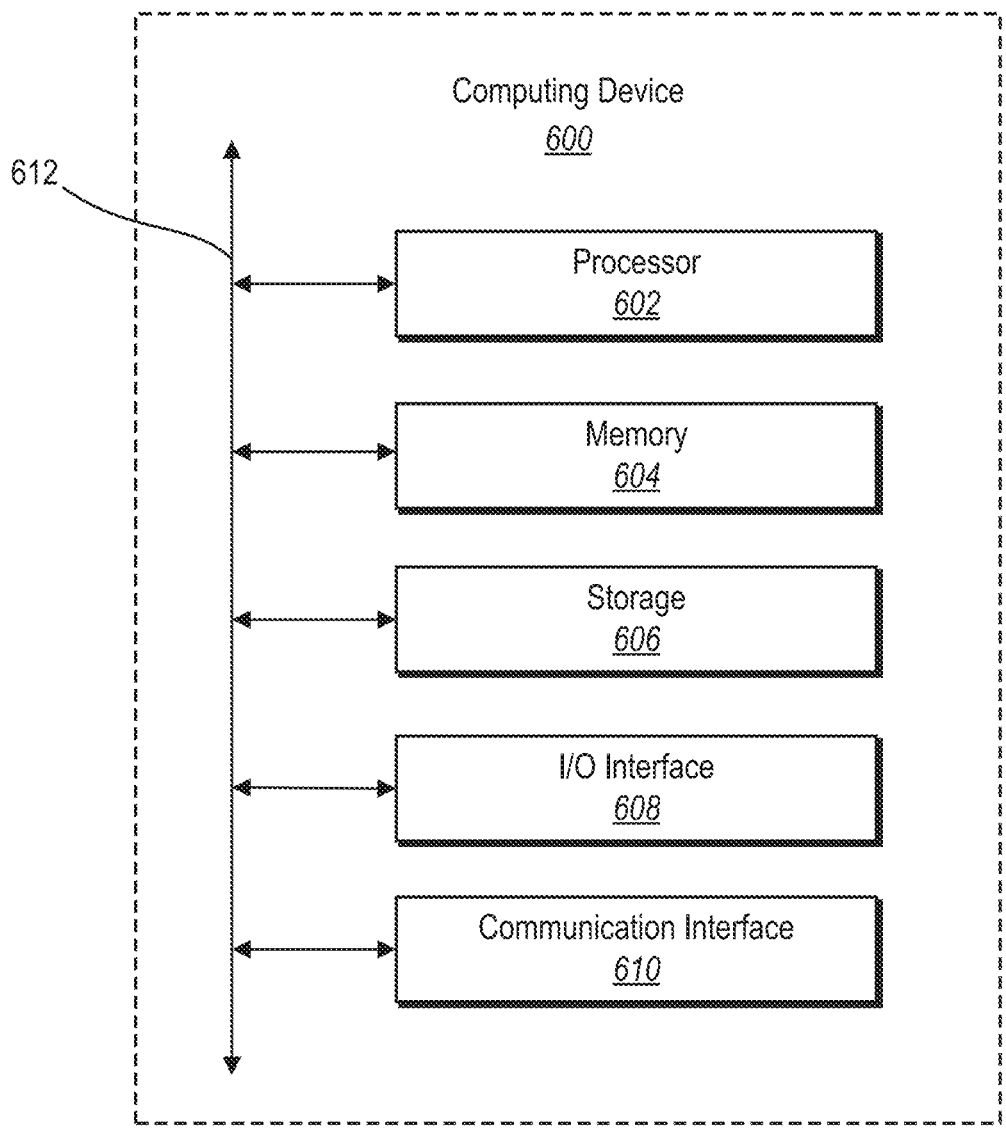
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the augmented reality system 100. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage device 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA)

bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the augmented reality system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and may construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 7:
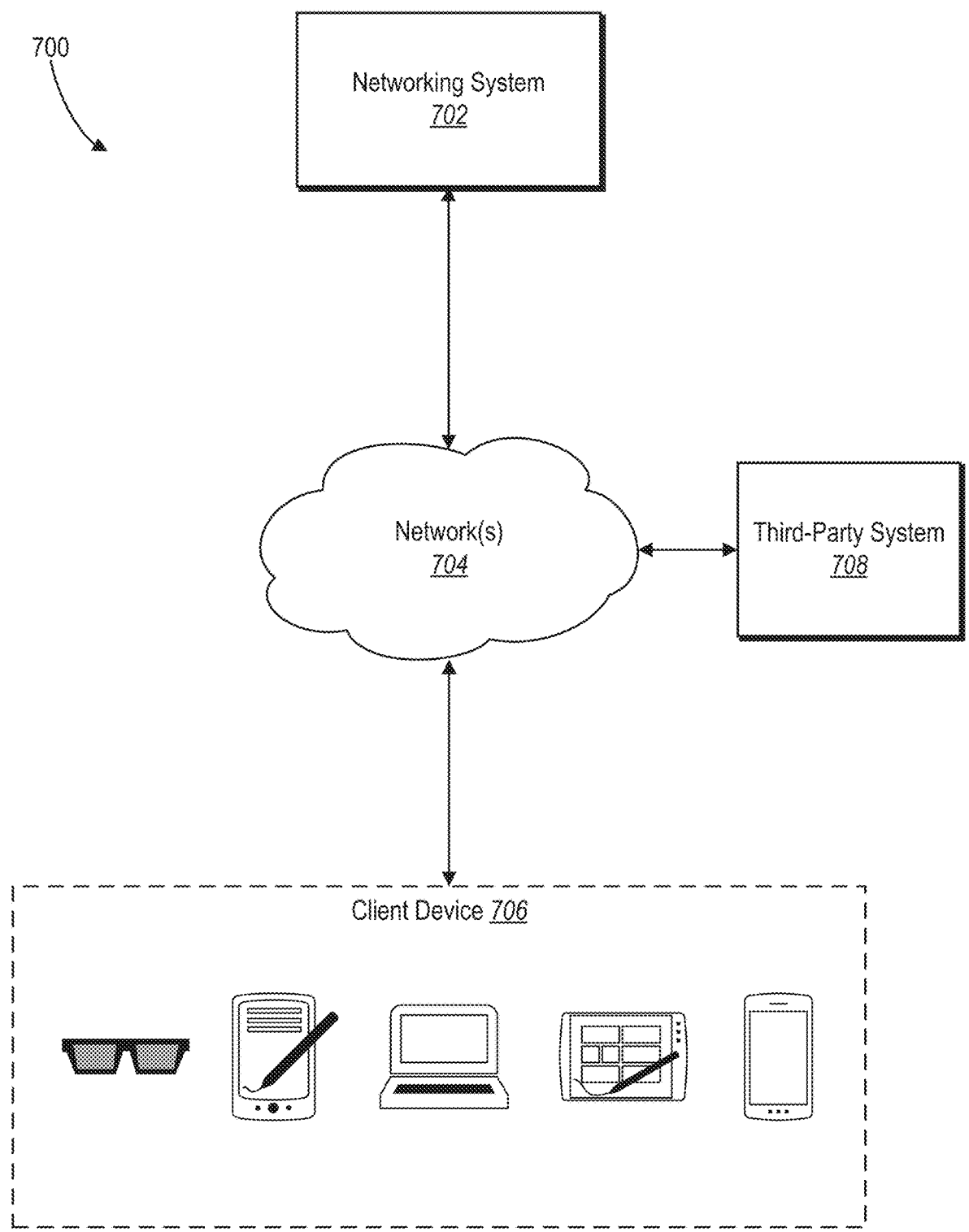
FIG. 7 is an example network environment of a networking system in accordance with one or more embodiments.

FIG. 7 illustrates an example network environment 700 of a social networking system. Network environment 700 includes a client device 706, a networking system 702, and a third-party system 708 connected to each other by a network 704. Although FIG. 7 illustrates a particular arrangement of client device 706, networking system 702, third-party system 708, and network 704, this disclosure contemplates any suitable arrangement of client device 706, networking system 702, third-party system 708, and network 704. As an example and not by way of limitation, two or more of client device 706, networking system 702, and third-party system 708 may be connected to each other directly, bypassing network 704. As another example, two or more of client device 706, networking system 702, and third-party system 708 may be physically or logically co-located with each other in whole or in part. Moreover, although FIG. 7 illustrates a particular number of client devices 706, networking systems 702, third-party systems 708, and networks 704, this disclosure contemplates any suitable number of client devices 706, networking systems 702, third-party systems 708, and networks 704. As an example and not by way of limitation, network environment 700 may include multiple client device 706, networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client device 706, networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 706. A client device 706 may enable a network user at client device 706 to access network 704. A client device 706 may enable its user to communicate with other users at other client devices 706.

In particular embodiments, client device 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client device 706 one or more Hyper Text Markup Language (HTML) files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 702 may be a network-addressable computing system that can host an online social network. Networking system 702 may generate, store, receive, and send social-networking data, such as, for example, user-profile data, concept-profile data, social-graph information, or other suitable data related to the online social network. Networking system 702 may be accessed by the other components of network environment 700 either directly or via network 704. In particular embodiments, networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 706, a networking system 702, or a third-party system 708 to manage, retrieve, modify, add, or delete, the information stored in data store.

In particular embodiments, networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 702 may provide users of the online social network the ability to communicate and interact with other users. In particular embodiments, users may join the online social network via networking system 702 and then add connections (e.g., relationships) to a number of other users of networking system 702 that they want to be connected to.

Herein, the term "friend" may refer to any other user of networking system 702 with whom a user has formed a connection, association, or relationship via networking system 702.

In particular embodiments, networking system 702 may provide users with the ability to take actions on various types of items or objects, supported by networking system 702. As an example and not by way of limitation, the items and objects may include groups or social networks to which users of networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 702 or by an external system of third-party system 708, which is separate from networking system 702 and coupled to networking system 702 via a network 704.

In particular embodiments, networking system 702 may be capable of linking a variety of entities. As an example and not by way of limitation, networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating networking system 702. In particular embodiments, however, networking system 702 and third-party systems 708 may operate in conjunction with each other to provide social-networking services to users of networking system 702 or third-party systems 708. In this sense, networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client device 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 702 also includes user-generated content objects, which may enhance a user's interactions with networking system 702. User-generated content may include anything a user can add, upload, send, or "post" to networking system 702. As an example and not by way of limitation, a user communicates posts to networking system 702 from a client device 706. Posts may include data such as status updates or other textual data, location information, photos, videos, links, music or other similar data or media. Content may also be added to networking system 702 by a third-party through a "communication channel," such as a newsfeed or stream.

In particular embodiments, networking system 702 may include a variety of servers, sub-systems, programs, modules, logs, and data stores. In particular embodiments, networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 702 may also include suitable components such as network interfaces, security mechanisms, load balancers, failover servers, management-and-network-operations consoles, other suitable components, or any suitable combination thereof. In particular embodiments, networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 702 to one or more client devices 706 or one or more third-party system 708 via network 704. The web server may include a mail server or other messaging functionality for receiving and routing messages between networking system 702 and one or more client devices 706. An API-request server may allow a third-party system 708 to access information from networking system 702 by calling one or more APIs. An action logger may be used to receive communications from a web server about a user's actions on or off networking system 702. In conjunction with the action log, a third-party-content-object log may be maintained of user exposures to third-party-content objects. A notification controller may provide information regarding content objects to a client device 706. Information may be pushed to a client device 706 as notifications, or information may be pulled from client device 706 responsive to a request received from client device 706. Authorization servers may be used to enforce one or more privacy settings of the users of networking system 702. A privacy setting of a user determines how particular information associated with a user can be shared. The authorization server may allow users to opt in to or opt out of having their actions logged by networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client devices 706 associated with users. Advertisement-pricing modules may combine social information, the current time, location information, or other suitable information to provide relevant advertisements, in the form of notifications, to a user.

Figure 8:
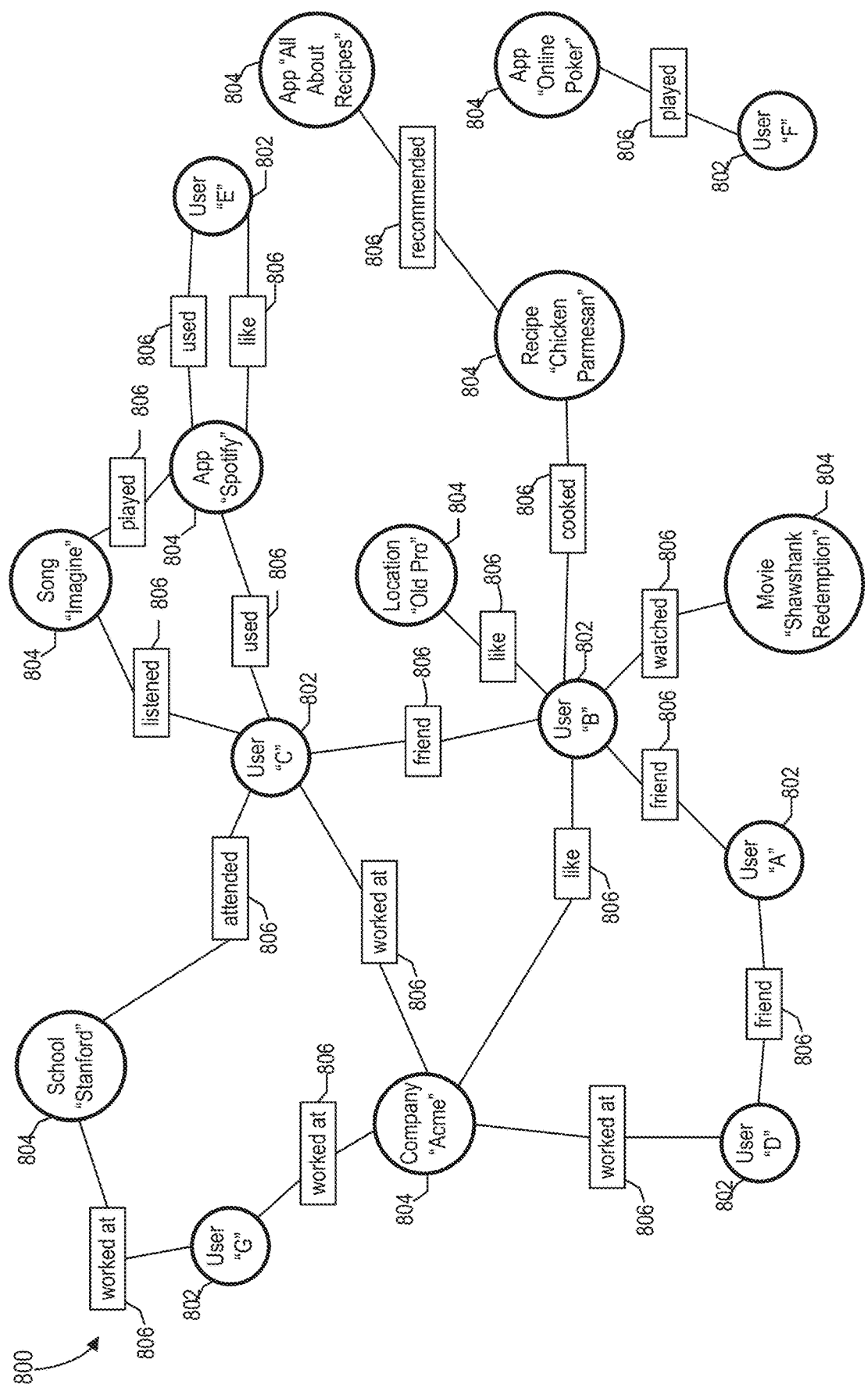
FIG. 8 illustrates a social graph in accordance with one or more embodiments.

FIG. 8 illustrates example social graph 800. In particular embodiments, networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a networking system 702, client device 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of networking system 702. As an example and not by way of limitation, a user may be an individual (human user), an entity (e.g., an enterprise, business, or third-party application), or a group (e.g., of individuals or entities) that interacts or communicates with or over networking system 702. In particular embodiments, when a user registers for an account with networking system 702, networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with networking system 702. In particular embodiments, a user node 802 may be associated with information provided by a user or information gathered by various systems, including networking system 702. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with networking system 702 or a third-party website associated with a web-application server); an entity (such as, for example, a person, business, group, sports team, or celebrity); a resource (such as, for example, an audio file, video file, digital photo, text file, structured document, or application) which may be located within networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to networking system 702. Profile pages may also be hosted on third-party websites associated with a third-party system 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 706 to send to networking system 702 a message indicating the user's action. In response to the message, networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, networking system 702 may send a "friend request" to the second user. If the second user confirms the "friend request," networking system 702 may create an edge 806 connecting the first user's user node 802 to the second user's user node 802 in social graph 800 and store edge 806 as social-graph information in one or more data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to a edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, networking system 702 may create an edge 806 between a user node 802 and a concept node 804 in social graph 800. As an example and not by way of limitation, a user viewing a concept-profile page (such as, for example, by using a web browser or a special-purpose application hosted by the user's client device 706) may indicate that he or she likes the concept represented by the concept node 804 by clicking or selecting a "Like" icon, which may cause the user's client device 706 to send to networking system 702 a message indicating the user's liking of the concept associated with the concept-profile page. In response to the message, networking system 702 may create an edge 806 between user node 802 associated with the user and concept node 804, as illustrated by "like" edge 806 between the user and concept node 804. In particular embodiments, networking system 702 may store an edge 806 in one or more data stores. In particular embodiments, an edge 806 may be automatically formed by networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 702) or RSVP (e.g., through networking system 702) to an event associated with the advertisement. In addition or as an alternative, an advertisement may include social-networking-system context directed to the user. As an example and not by way of limitation, an advertisement may display information about a friend of the user within networking system 702 who has taken an action associated with the subject matter of the advertisement.

In particular embodiments, networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 702 may calculate a coefficient based on a user's actions. Networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Networking system 702 may analyze a user's actions to determine whether one or more of the actions indicate an affinity for subject matter, content, other users, and so forth. As an example and not by way of limitation, if a user may make frequently posts content related to "coffee" or variants thereof, networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 702 may calculate a coefficient based on the type of relationship between particular objects. Referencing the social graph 800, networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user node 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 702 may determine that the user has a higher coefficient with respect to the first photo than the second photo because having a tagged-in-type relationship with content may be assigned a higher weight and/or rating than having a like-type relationship with content. In particular embodiments, networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 702 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 706 of the user). A first user may be more interested in other users or concepts that are closer to the first user. As an example and not by way of limitation, if a user is one mile from an airport and two miles from a gas station, networking system 702 may determine that the user has a higher coefficient for the airport than the gas station based on the proximity of the airport to the user.

In particular embodiments, networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 702 may provide information that is relevant to user's interests and current circumstances, increasing the likelihood that they will find such information of interest. In particular embodiments, networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, networking system 702 may calculate the coefficient (or access the coefficient information if it has previously been calculated and stored). In particular embodiments, networking system 702 may measure an affinity with respect to a particular process. Different processes (both internal and external to the online social network) may request a coefficient for a particular object or set of objects. Networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 702 may send a request to the data store for the object. The request may identify the user associated with the request and may only be sent to the user (or a client device 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   receiving an image from an augmented reality display device associated with a location of the augmented reality display device and depicting a networking system co-user;
   generating an augmented reality overlay for the networking system co-user by:
   identifying a plurality of augmented reality elements that correspond to the location of the augmented reality display device,
   determining, based on information associated with the networking system co-user, a score for each of the plurality of augmented reality elements,
   generating a graphical mesh representing a 3-dimensional shape of the networking system co-user,
   determining one or more constraints associated with the graphical mesh representing the 3-dimensional shape of the networking system co-user, and
   applying one or more highest scoring of the plurality of augmented reality elements to the graphical mesh according to the one or more constraints associated with the graphical mesh; and
   providing the generated augmented reality overlay to the augmented reality display device.

2. The method as recited in claim 1, further comprising determining the location of the augmented reality display device.

3. The method as recited in claim 2, wherein identifying the plurality of augmented reality elements that correspond to the location of the augmented reality display device comprises identifying augmented reality elements associated with one or more of a GPS location of the augmented reality display device, WiFi information associated with the augmented reality display device, networking system information associated with the augmented reality display device, or image analysis information associated with the received image.

4. The method as recited in claim 2, wherein identifying the plurality of augmented reality elements that correspond to the location of the augmented reality display device is based on one or more of Internet lookups associated with the location of the augmented reality display device or database searches associated with the location of the augmented reality display device.

5. The method as recited in claim 2, wherein determining the score for each of the plurality of augmented reality elements comprises, for each of the plurality of augmented reality elements, calculating the score based on one or more of user preferences associated with a user of the augmented reality display device, networking system information associated with the user of the augmented reality display device, and a networking system relationship coefficient between the user of the augmented reality display device and the networking system co-user.

6. The method as recited in claim 1, wherein generating a graphical mesh representing the 3-dimensional shape of the networking system co-user comprises:
scanning the received image to determine a 2-dimensional shape associated with the networking system co-user;
generating a point cloud of data from the data from networking system co-user's 2-dimensional shape; and
generating, based on the point cloud, the graphical mesh representing the 3-dimensional shape of the networking system co-user.

7. The method as recited in claim 1, wherein applying one or more highest scoring of the plurality of augmented reality elements to the graphical mesh comprises:
identifying a subset of the plurality of augmented reality elements with scores above a threshold amount; and
applying the subset of the plurality of augmented reality elements to the graphical mesh according to the one or more constraints associated with the graphical mesh.

8. The method as recited in claim 7, further comprising: identifying one or more reality-based constraints; and
wherein applying the subset of the plurality of augmented reality elements to the graphical mesh is further according to the one or more reality-based constraints.

9. A system comprising:
at least one processor; and
at least one non-transitory computer-readable storage medium storing instructions thereon that, when executed by the at least one processor, cause the system to:
receive an image from an augmented reality display device associated with a location of the augmented reality display device and depicting a networking system co-user;
generate an augmented reality overlay for the networking system co-user by:
identifying a plurality of augmented reality elements that correspond to the location of the augmented reality display device,
determining, based on information associated with the networking system co-user, a score for each of the plurality of augmented reality elements,
generating a graphical mesh representing a 3-dimensional shape of the networking system co-user,
determining one or more constraints associated with the graphical mesh representing the 3-dimensional shape of the networking system co-user, and
applying one or more highest scoring of the plurality of augmented reality elements to the graphical mesh according to the one or more constraints associated with the graphical mesh; and
provide the generated augmented reality overlay to the augmented reality display device.

10. The system as recited in claim 9, further comprising determining the location of the augmented reality display device.

11. The system as recited in claim 10, wherein identifying the plurality of augmented reality elements that correspond to the location of the augmented reality display device comprises identifying augmented reality elements associated with one or more of a GPS location of the augmented reality display device, WiFi information associated with the augmented reality display device, networking system information associated with the augmented reality display device, or image analysis information associated with the received image.

12. The system as recited in claim 11, wherein identifying the plurality of augmented reality elements that correspond to the location of the augmented reality display device is based on one or more of Internet lookups associated with the location of the augmented reality display device or database searches associated with the location of the augmented reality display device.

13. The system as recited in claim 12, wherein determining the score for each of the plurality of augmented reality elements comprises, for each of the plurality of augmented reality elements, calculating the score based on one or more of user preferences associated with a user of the augmented reality display device, networking system information associated with the user of the augmented reality display device, and a networking system relationship coefficient between the user of the augmented reality display device and the networking system co-user.

14. The system as recited in claim 13, wherein generating a graphical mesh representing the 3-dimensional shape of the networking system co-user comprises:
scanning the received image to determine a 2-dimensional shape associated with the networking system co-user;
generating a point cloud of data from the data from networking system co-user's 2-dimensional shape; and
generating, based on the point cloud, the graphical mesh representing the 3-dimensional shape of the networking system co-user.

15. The system as recited in claim 14, wherein applying one or more highest scoring of the plurality of augmented reality elements to the graphical mesh comprises:
identifying a subset of the plurality of augmented reality elements with scores above a threshold amount; and
applying of the subset of the plurality of augmented reality elements to the graphical mesh according to the one or more constraints associated with the graphical mesh.

16. The system as recited in claim 15, further comprising: identifying one or more reality-based constraints; and
wherein applying the subset of the plurality of augmented reality elements to the graphical mesh is further according to the one or more reality-based constraints.

17. A non-transitory computer-readable medium storing instructions thereon that, when executed by at least one processor, cause a computer system to:
- receive an image from an augmented reality display device associated with a location of the augmented reality display device and depicting a networking system co-user;
- generate an augmented reality overlay for the networking system co-user by:
  - identifying a plurality of augmented reality elements that correspond to the location of the augmented reality display device,
  - determining, based on information associated with the networking system co-user, a score for each of the plurality of augmented reality elements,
  - generating a graphical mesh representing a 3-dimensional shape of the networking system co-user,
  - determining one or more constraints associated with the graphical mesh representing the 3-dimensional shape of the networking system co-user, and
  - applying one or more highest scoring of the plurality of augmented reality elements to the graphical mesh according to the one or more constraints associated with the graphical mesh; and
- provide the generated augmented reality overlay to the augmented reality display device.

18. The non-transitory computer-readable medium as recited in claim 17, further comprising
- determining the location of the augmented reality display device.

19. The non-transitory computer-readable medium as recited in claim 18, wherein generating a graphical mesh representing the 3-dimensional shape of the networking system co-user comprises:
- scanning the received image to determine a 2-dimensional shape associated with the networking system co-user;
- generating a point cloud of data from the data from networking system co-user's 2-dimensional shape; and
- generating, based on the point cloud, the graphical mesh representing the 3-dimensional shape of the networking system co-user.

20. The non-transitory computer-readable medium as recited in claim 19, wherein applying one or more highest scoring of the plurality of augmented reality elements to the graphical mesh comprises:
- identifying a subset of the plurality of augmented reality elements with scores above a threshold amount; and
- applying the subset of the plurality of augmented reality elements to the graphical mesh according to the one or more constraints associated with the graphical mesh.

* * * * *